(12) United States Patent
Duncan

(10) Patent No.: US 8,572,398 B1
(45) Date of Patent: Oct. 29, 2013

(54) SYSTEMS AND METHODS FOR IDENTIFYING BIOMETRIC INFORMATION AS TRUSTED AND AUTHENTICATING PERSONS USING TRUSTED BIOMETRIC INFORMATION

(71) Applicant: Daniel Duncan, Austin, TX (US)

(72) Inventor: Daniel Duncan, Austin, TX (US)

( * ) Notice: Subject to any disclaimer, the term of this patent is extended or adjusted under 35 U.S.C. 154(b) by 0 days.

(21) Appl. No.: 13/766,116

(22) Filed: Feb. 13, 2013

(51) Int. Cl.
*G06F 21/00* (2013.01)

(52) U.S. Cl.
USPC ........................................................ 713/186

(58) Field of Classification Search
None
See application file for complete search history.

(56) References Cited

U.S. PATENT DOCUMENTS

| | | | |
|---|---|---|---|
| 5,386,104 A | 1/1995 | Sime | |
| 5,613,012 A | 3/1997 | Hoffman et al. | |
| 6,104,922 A | 8/2000 | Baumann | |
| 6,105,010 A | 8/2000 | Musgrave | |
| 6,157,707 A | 12/2000 | Baulier et al. | |
| 7,164,754 B2 | 1/2007 | Trinkel et al. | |
| 7,212,613 B2 | 5/2007 | Kim et al. | |
| 7,224,786 B2 | 5/2007 | Daugherty et al. | |
| 7,310,042 B2 | 12/2007 | Seifert | |
| 7,363,505 B2 | 4/2008 | Black | |
| 7,386,448 B1 | 6/2008 | Poss et al. | |
| 7,430,287 B2 | 9/2008 | Daugherty et al. | |
| 7,669,759 B1 | 3/2010 | Zettner | |
| 7,686,214 B1 | 3/2010 | Shao et al. | |
| 7,716,055 B1 | 5/2010 | McIntosh et al. | |
| 7,752,084 B2 | 7/2010 | Pettitt | |
| 7,779,457 B2 | 8/2010 | Taylor | |
| 7,801,288 B2 | 9/2010 | Wasserblat et al. | |
| 7,819,322 B2 | 10/2010 | Hammad et al. | |
| 7,933,835 B2 | 4/2011 | Keane et al. | |
| 8,073,691 B2 | 12/2011 | Rajakumar | |
| 8,171,303 B2 | 5/2012 | Bronstein et al. | |
| 8,190,527 B2 | 5/2012 | Stanley | |
| 8,311,826 B2 | 11/2012 | Rajakumar | |
| 2001/0053239 A1 | 12/2001 | Takhar | |
| 2003/0149744 A1 | 8/2003 | Bierre et al. | |
| 2004/0158723 A1 | 8/2004 | Root | |
| 2004/0234117 A1 | 11/2004 | Tibor | |
| 2004/0258281 A1 | 12/2004 | Delgrosso et al. | |
| 2006/0106605 A1 | 5/2006 | Saunders et al. | |
| 2006/0248019 A1 | 11/2006 | Rajakumar | |
| 2007/0021981 A1 | 1/2007 | Cox | |
| 2007/0061590 A1 | 3/2007 | Boye et al. | |
| 2007/0110283 A1* | 5/2007 | Hillhouse et al. | 382/115 |
| 2007/0233614 A1 | 10/2007 | McNelley et al. | |
| 2007/0280436 A1 | 12/2007 | Rajakumar | |
| 2009/0119106 A1 | 5/2009 | Rajakumar et al. | |
| 2010/0004965 A1 | 1/2010 | Eisen | |

(Continued)

*Primary Examiner* — Brandon Hoffman
(74) *Attorney, Agent, or Firm* — Crowell & Moring LLP

(57) ABSTRACT

Systems and methods of identifying biometric information as trusted and authenticating persons using trusted biometric information are provided. Biometric information can be identified as trusted by comparing it to other biometric information and/or based on the age of the biometric information and/or receiving correct answers to questions based on personal information. Once biometric information has been identified as trusted it can be used as part of an authentication process by receiving biometric information from a person to be authenticated and comparing the received biometric information with the trusted biometric information.

30 Claims, 15 Drawing Sheets

(56) References Cited

U.S. PATENT DOCUMENTS

| | | |
|---|---|---|
| 2010/0014720 A1 | 1/2010 | Hoyos et al. |
| 2010/0051684 A1 | 3/2010 | Powers |
| 2010/0303211 A1 | 12/2010 | Hartig et al. |
| 2010/0305960 A1 | 12/2010 | Gutierrez et al. |
| 2012/0053939 A9 | 3/2012 | Gutierrez et al. |
| 2012/0054202 A1 | 3/2012 | Rajakumar |
| 2012/0072453 A1 | 3/2012 | Guerra et al. |
| 2012/0084078 A1 | 4/2012 | Moganti et al. |
| 2012/0253805 A1 | 10/2012 | Rajakumar et al. |
| 2012/0254243 A1 | 10/2012 | Zeppenfeld et al. |
| 2012/0263285 A1 | 10/2012 | Rajakumar et al. |

* cited by examiner

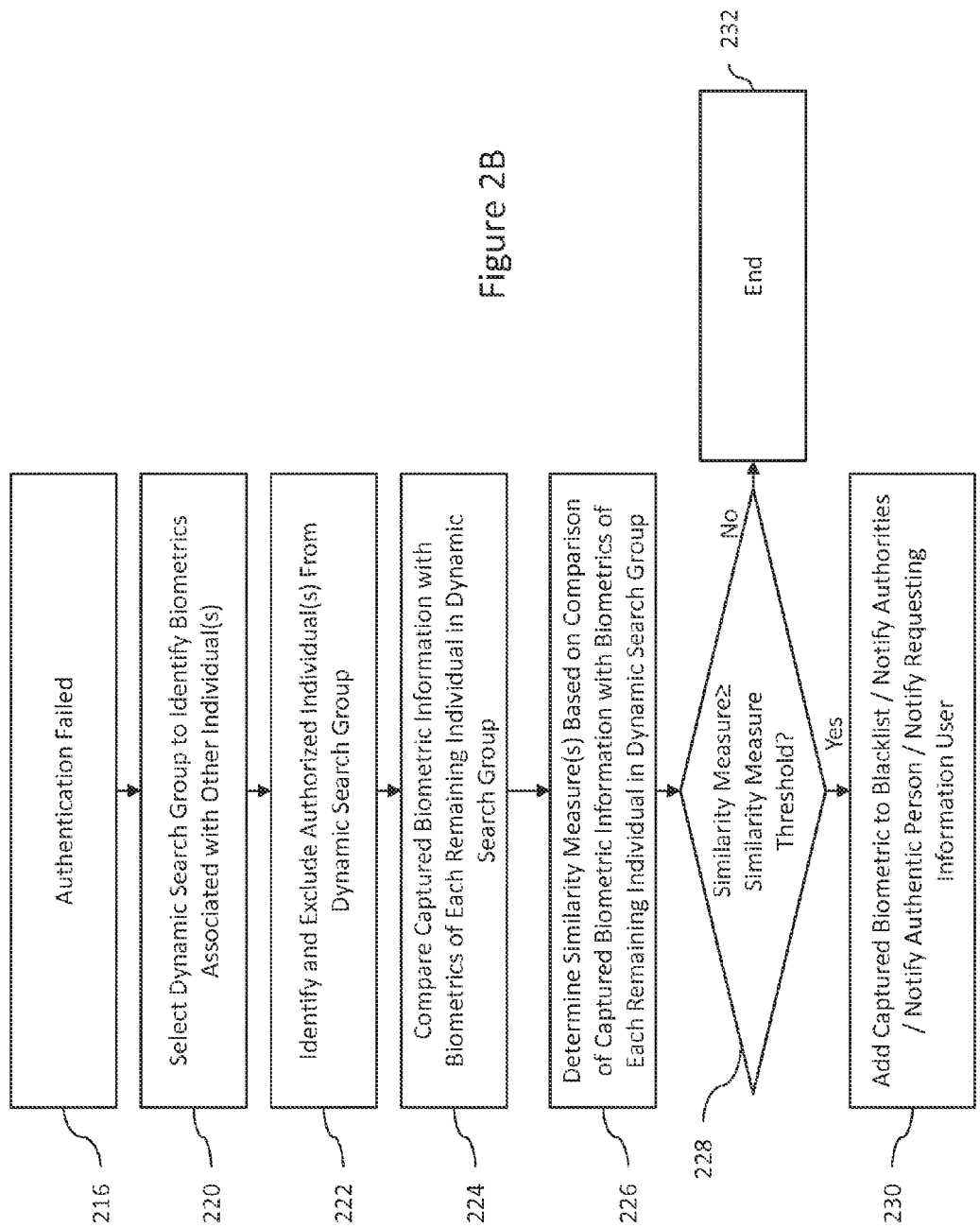

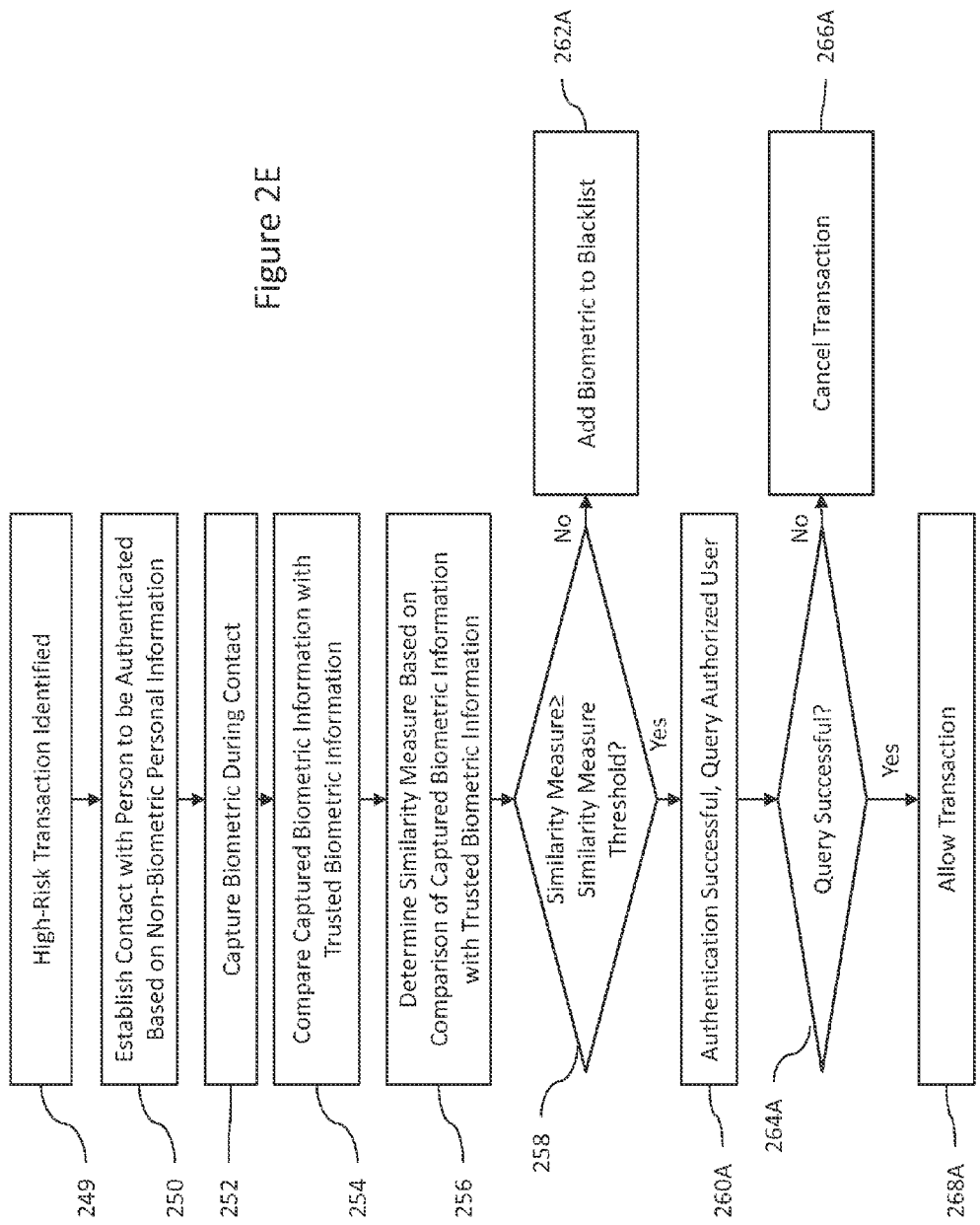

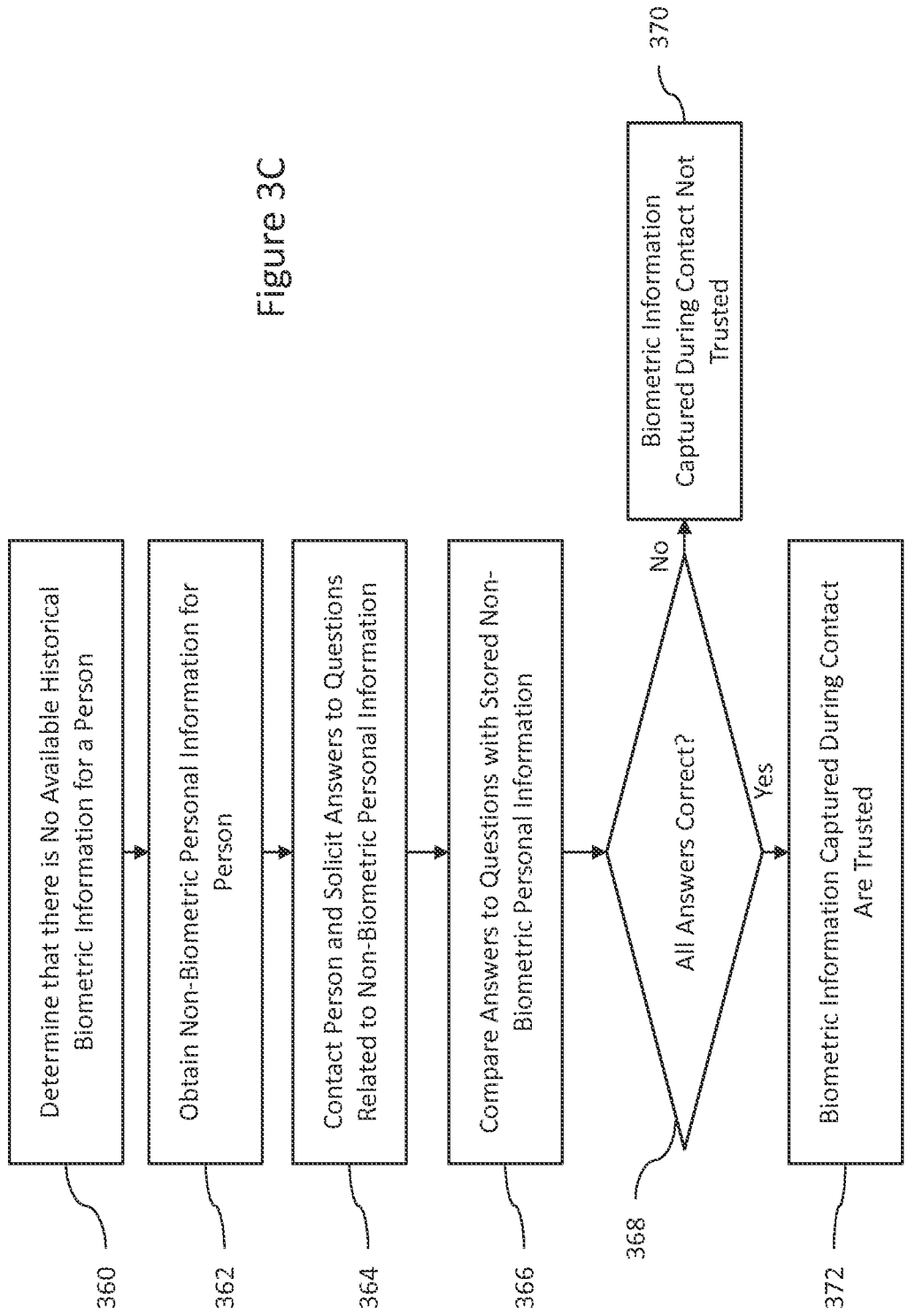

SYSTEMS AND METHODS FOR IDENTIFYING BIOMETRIC INFORMATION AS TRUSTED AND AUTHENTICATING PERSONS USING TRUSTED BIOMETRIC INFORMATION

BACKGROUND OF THE INVENTION

The costs associated with fraud are rapidly increasing every year. It is common to employ some type of identity verification to combat fraud. Thus, for example, merchants frequently require persons writing checks to provide a government-issued identification so that the signature on the check can be compared to the signature on the government-issued identification and the picture on the government issued identification can be compared to the person presenting the check. Although this works quite well for verifying in-person transactions, it does not work for other types of transactions, such as online transactions, telephonic transactions, and in-person automated transactions.

SUMMARY OF THE INVENTION

Most online transactions and in-person automated transactions have multiple levels of verification, such as requiring the provision of a credit verification value (CVV or CVV2) and/or billing address zip code. However, this type of information is easily obtainable either from the credit card and/or a copy of the credit card bill. Thus, for example, a husband can use his wife's credit card without her knowledge and the merchant accepting the credit card will assume the wife has initiated the transaction because he is able to provide the credit card verification value and/or billing address zip code.

More advanced verification techniques use biometrics, such as fingerprints, voice prints, retinal scans, etc. Specifically, when a person needs to be authenticated the person provides a biometric, which is then compared to a stored biometric. In order for these types of techniques to be secure there must be mechanisms for ensuring that the stored biometric was actually obtained from a particular person. The easiest way to do this would be to require the person to show up in-person and provide a government-issued identification for verification when providing the biometric. While this provides a relatively secure way to obtain the initial biometric, it is very inconvenient and incompatible with peoples' growing expectations to be able to conduct all transactions remotely, e.g., online or over the telephone.

Accordingly, exemplary embodiments of the present invention provide techniques for authenticating people using biometrics in such a way that the stored biometrics are trusted without inconveniencing users. Specifically, exemplary embodiments of the present invention can use stored biometrics that were obtained from independent information sources and independently of the authentication process, either alone or along with other information, to determine whether the stored biometrics are to be considered as trusted biometrics that can be used to authenticate a person providing real-time biometrics.

In accordance with certain embodiments a method involves a centralized computer receiving personal information for a first person from a plurality of independent sources, wherein the personal information for the first person includes a first historical biometric information from a first one of the plurality of independent sources; comparing an age of the first historical biometric information to a predetermined age threshold; identifying the first historical biometric information as first trusted biometric information when the age of the first historical biometric information is greater than or equal to the predetermined age threshold; receiving a request to authenticate a person, wherein the request to authenticate includes second biometric information; comparing the second biometric information with the first trusted biometric information; determining a first similarity measure based on the comparison of the second biometric information with the first trusted biometric information; and authenticating the person as the first person when the first similarity measure is greater than or equal to a first similarity measure threshold.

The first and second biometric information can be voice biometric information. The method can further involve the centralized computer receiving additional, non-biometric personal information for the first person from one of the plurality of independent sources and comparing the additional, non-biometric personal information for the first person with other non-biometric personal information for the first person, wherein the other non-biometric personal information is obtained from a source other than the plurality of independent sources, wherein the first historical biometric information is identified as first trusted biometric information when the age of the first historical biometric information is greater than or equal to the predetermined age threshold and the additional, non-biometric personal information matches the other non-biometric personal information.

The centralized computer can receive an indication whether the relationship with the first person has been maintained in good standing for a predetermined period of time and the first historical biometric information can identified as first trusted biometric information when the age of the first historical biometric information is greater than or equal to the predetermined age threshold and the relationship with the first person has been maintained in good standing for a predetermined period of time.

The personal information for the first person can be received from the first one and second one of the plurality of independent sources in bulk with personal information for a plurality of other persons. Further, the personal information for the first person and the plurality of other persons includes historical voice biometric information obtained independent of a process of identifying the first historical biometric information first trusted biometric information.

The second biometric information can be near-real-time biometric information. Additionally, the person can be authenticated as the first person based exclusively on whether the first similarity measure is greater than or equal to the first similarity measure threshold.

The authentication of the first person can also involve the centralized computer comparing the second biometric information with biometric information in a blacklist of known fraudsters.

Moreover, the first person can have a device executing an application, and after authenticating the person as the first person the method can also involve receiving, by the application from the centralized computer, a single-use password; providing, by the application, the single-use password to the person; providing, by the person to a third party, a user name and the single-use password; transmitting, by the third party, the user name and a password to the centralized computer; and receiving, by the third party, an authorization of the person when the password transmitted to the centralized computer matches the single-use password.

In accordance with another aspect of the present invention, a method can involve a centralized computer receiving a request to authenticate a person, wherein the request is received from an application executing on a device in possession of the person and the request includes first biometric information captured from the person and payment credentials for a first person; attempting to authorize payment using the payment credentials; and authenticating the person as the first person when the payment is authorized based on the payment credentials.

Additionally, the first biometric information can be flagged as untrusted and the first biometric information can be added to a blacklist when the payment is not authorized based on the payment credentials.

The method can also involve comparing the first biometric information with biometric information of known fraudsters, wherein the person is not authenticated when the first biometric information matches biometric information of one of the known fraudsters.

The method can further involve the centralized computer initiating a contact using contact information associated with the first person and soliciting from a person answering the contact answers to questions that are generated using the personal information for the first person, wherein the person is authenticated as the first person when the payment is authorized based on the payment credentials and the answers provided by the person answering the contact match the personal information for the first person.

When the payment is not authorized based on the payment credentials, the method can further involve the centralized computer selecting a dynamic search group of individuals having an association with the first person; comparing available biometric information for each of the individuals in the dynamic search group with the first biometric information; and determining a similarity measure based on the comparison of the available biometric information for each of the individuals in the dynamic search group with the first biometric information. When the similarity measure for a particular one of the individuals is greater than or equal to a predetermined similarity measure the individuals are added to a blacklist.

Other objects, advantages and novel features of the present invention will become apparent from the following detailed description of the invention when considered in conjunction with the accompanying drawings.

BRIEF DESCRIPTION OF THE DRAWING FIGURES

FIGS. 2A-2E are flow diagrams of exemplary methods in accordance exemplary embodiments of the present invention;

FIGS. 3A-3C are flow diagrams of exemplary methods for identifying trusted biometric information in accordance with the present invention;

DETAILED DESCRIPTION OF THE PREFERRED EMBODIMENTS

Figure 1:
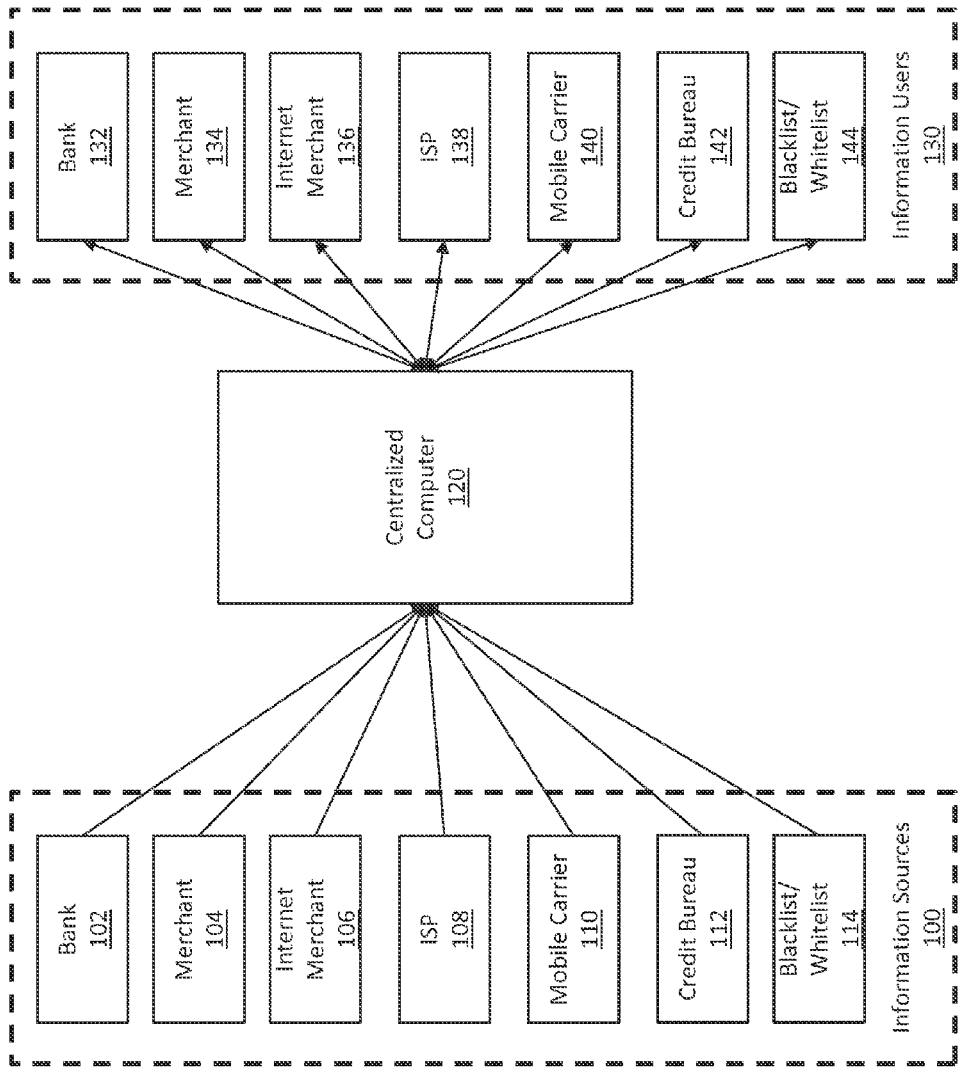
FIG. 1 is a block diagram of an exemplary system in accordance with the present invention.

FIG. 1 is a block diagram of an exemplary system in accordance with the present invention. A centralized computer 120 is arranged so that it receives historical personal information regarding a number of different persons from a plurality of independent information sources 100. The information sources 100 include one of more banks 102, merchants 104, internet merchants 106, internet service providers (ISPs) 108, mobile carriers 110, credit bureaus 112, and blacklists and/or whitelists 114. The particular information sources illustrated in FIG. 1 are merely exemplary and the centralized computer 120 can receive historical personal information from one of the information sources, all of the information sources, or a subset of the information sources. Further, the centralized computer 120 can receive historical personal information from information sources other than those illustrated in FIG. 1.

The historical personal information can include one or more biometric information and/or non-biometric information. The biometric information can be any type of biometric information including, but not limited to, voice biometric information, fingerprint biometric information, retinal scan biometric information, and/or the like. The non-biometric information can include any other type of information about a person including, but not limited to, credit history, current and past addresses, telephone number(s), electronic mail address, transaction history, social security number, and/or the like. Different information sources 100 can provide the same or different type of biometric and/or non-biometric information.

The personal information provided by information sources 100 are referred to as "historical" to denote that the information was previously received and stored by an information source independent of the processing by centralized computer 120. Thus, for example, a bank 102 can provide historical voice biometric information that was collected from recorded telephone calls with a particular person when the person was inquiring about his/her account. The bank 102 would provide this historical voice biometric information along with identification information of the customer that provided the historical voice biometric information and any other information, such as the day and time on which the historical voice biometric information was recorded. Banks and other information sources typically store such information for a period of time for quality assurance and fraud prevention. For example, when a customer later disputes a charge or bill, the bank or other information source can access the stored information in order to determine at that time whether the stored information was provided by the actual customer. This one-off fraud prevention, however, is significantly different from the establishment of trusted biometrics by a centralized source as in the present invention.

As will be discussed in more detail below, the centralized computer 120 processes the stored personal information to determine whether it can be considered as trusted so that it can be used to authenticate future transactions for information users 130. As illustrated in FIG. 1, the information users 130 include one of more banks 132, merchants 134, internet merchants 136, internet service providers (ISPs) 138, mobile carriers 140, credit bureaus 142, and blacklists and/or whitelists 144. The particular information users illustrated in FIG. 1 are merely exemplary and the centralized computer 120 can authenticate future transactions for one of the information users, all of the information users, or a subset of the information users. Further, the centralized computer 120 can authenticate transactions for information users other than those illustrated in FIG. 1.

As will be appreciated in view of the methods discussed below, centralized computer 120 acts as a single, universal repository of biometric and associated non-biometric personal information that can be used to authenticate persons using biometric information captured in real-time or near-real-time from persons to be authenticated. Because centralized computer 120 is not associated with any particular information source, it is able to obtain and aggregate a large amount of biometric and associated non-biometric personal information compared to any individual information source. Further, by aggregating biometric and associated non-biometric information for any particular person from a number of sources, the determination of whether the historical biometric information is to be trusted is more reliable than can typically be obtained by any single source. For example, a bank may have a number of voice prints and associated personal information for a particular person but the voice prints may not have ever been produced by the actual person associated with the personal information because a fraudster opened and used the account with stolen personal information. In this case the bank may determine that the fraudster is the actual person authorized because when the fraudster submits a voice print for authentication it is being compared to a historical voice print provided by the fraudster.

Figure 2A:
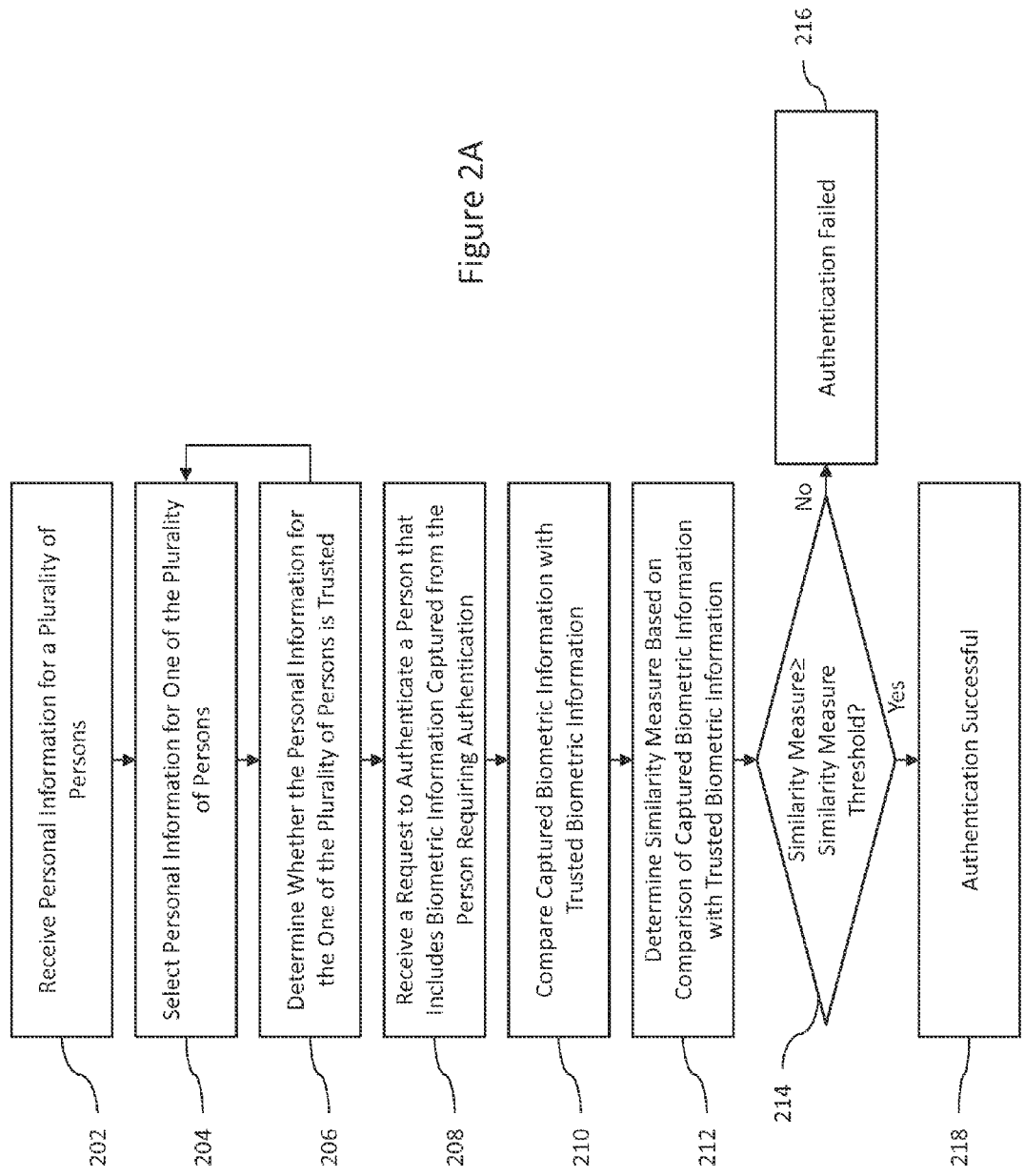

Now that an overview of the overall system of the present invention has been provided, methods of identifying biometric information as trusted and using the trusted biometric information for authentication will be described in more detail below in connection with FIGS. 2A-7B. FIGS. 2A and 2B are flow diagrams of exemplary methods in accordance exemplary embodiments of the present invention. Turning first to FIG. 2A, centralized computer 120 receives personal information for a plurality of persons from one or more information sources 100 (step 202). Centralized computer 120 then selects personal information for one of the plurality of persons (step 204) and determines whether the personal information for the selected person is trusted personal information (step 206). The particular manner of determining whether personal information is trusted personal information will be described in more detail below in connection with FIGS. 3A-3C. As illustrated by the return path from step 206 to step 204, the centralized computer 120 will continue to process the personal information received from the information sources 100 for each of the plurality of persons in order to establish personal information as trusted personal information, which includes trusted biometric information.

Once biometric information is established as trusted biometric information, an information user 130 can capture biometric information from a person to be authenticated and contact the centralized computer 120 for authentication of the person using the captured biometric information. The contact by the person to be authenticated to the information user 130 can be an in-person contact or a remote contact, such as by an inbound call, electronic mail, text, a web page, and/or the like. When centralized computer 120 receives a request to authenticate a person, which includes biometric information captured from the person requiring authentication, from an information user 130 (step 208), the centralized computer 120 compares the captured biometric information with the trusted biometric information (step 210). As will be described in more detail below in connection with the methods illustrated in FIGS. 3A and 3B, the trusted biometric can be a single biometric or more than one biometric. When there is more than one trusted biometric, the comparison can be to any of the trusted biometrics or can be with a composite of the trusted biometrics. The centralized computer 120 uses this comparison to determine a similarity measure (step 212), which indicates a measure of the similarity between the captured biometric information and the trusted biometric information.

When the centralized computer 120 determines that the similarity measure is greater than or equal to a similarity measure threshold ("Yes" path out of decision step 214), then the authentication is successful (step 218), which means that the person to be authenticated (i.e., the person whose captured biometric was received in step 208) is the authentic individual (i.e., the person from whom the trusted biometric was obtained). Accordingly, the centralized computer 120 can inform the information user 130 that requested authentication that the authentication was successful, the authentication can be used to authorize payment for a transaction, the authentication can be used to authorize the generation of a single-use password, and/or the like. Further, the captured biometric can be stored by the centralized computer 120 as a trusted biometric along with the previously stored trusted biometric(s) and other information for the person.

When the centralized computer 120 determines that the similarity measure is less than a similarity measure threshold ("No" path out of decision step 214), then the authentication has failed (step 216). A number of different responses can be performed when authentication has failed. First, the information user 130 that sent the authentication request is informed that the authentication has failed. As an alternative or in addition to notifying the information user 130 that the authentication has failed, dynamic search groups can be employed to identify fraudsters that may have a relationship with the authentic person as illustrated in FIG. 2B.

Turning now to FIG. 2B, when authentication has failed (step 216), the centralized computer 120 selects a dynamic search group to identify biometrics associated with other individuals (step 220). The dynamic search group is intended to identify persons that may have unauthorized access to personal information of the authentic person. Thus, for example, persons living in the same apartment building may be part of a dynamic search group because a fraudster living in the apartment building may be able to intercept mail, such as credit offers, intended for the authentic person. Other criteria for establishing dynamic search groups includes, but is not limited to, persons in the same household (e.g., based on address and surname), a mailing address (excluding apartment numbers), a census block group, a zip code, a zip code plus 4 (i.e., a five digit zip code and four digit extension), and a distance radius around the mailing address of the authentic person based on the latitude and longitude of the mailing address. Further, the dynamic search group can be created based upon similarity of certain information to the authentic person, such as similarity of account number, social security number, telephone number, electronic mail address, and Internet Protocol (IP) address.

The centralized computer 120 identifies and excludes authorized individuals from the dynamic search group (step 222). Thus, for example, if the authentic person is a women and her husband is also authorized on the account then the husband would be excluded from the dynamic search group. The centralized computer 120 then compares the captured biometric used for the authentication (i.e., from step 208) to biometrics of persons from the dynamic search group to determine a similarity measure (step 226). When centralized computer 120 determines that the similarity measure is greater than or equal to a similarity measure threshold ("Yes" path out of decision step 228), then centralized computer 120 can add the captured biometric to a blacklist along with an identification of the matching person from the dynamic search group, proper authorities can be notified of the fraudulent activity, the authentic person can be notified of the potential fraudulent activity, and/or the information user 130 that sent the authentication request can be notified that the person calling from whom the information user 130 captured the biometric that is used in step 208 is different than the authentic user or that the authenticated failed (step 230). Otherwise, when centralized computer 120 determines that there is no match between the captured biometric and biometrics from the dynamic search group then processing ends (step 232). The similarity measure threshold used as part of the dynamic search group process can be the same or different from the similarity measure thresholds used to determine trusted biometrics, which is described below, or the similarity measure threshold used as part of the authentication (step 214 described above).

Figure 2C:
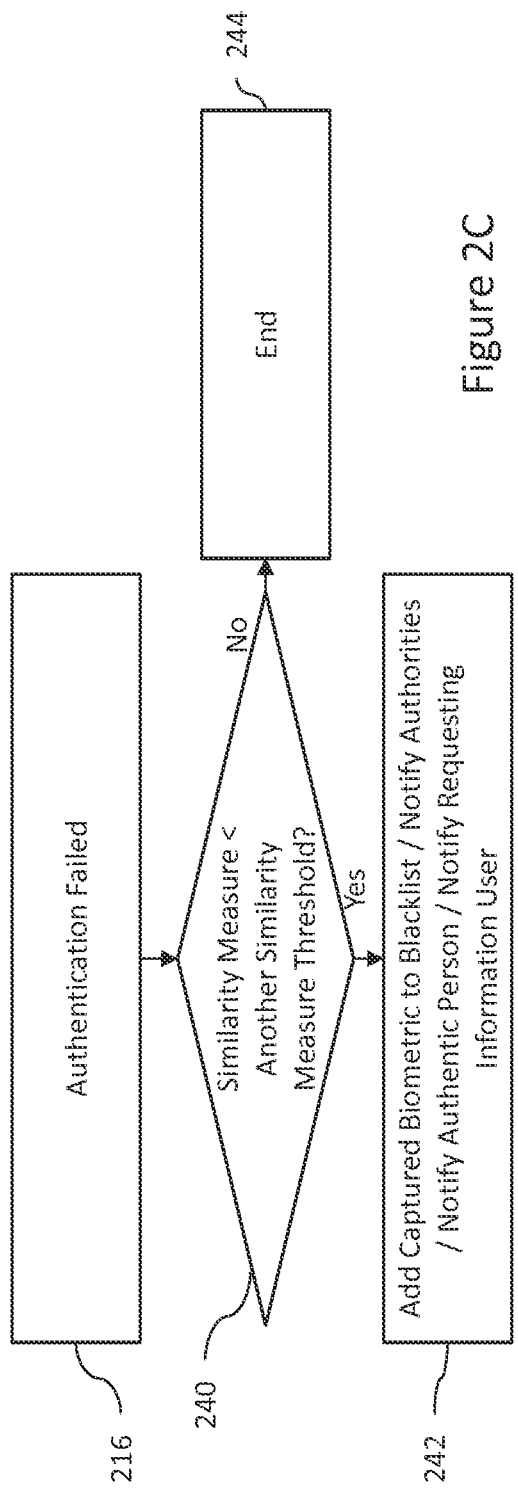

As an alternative to, or in addition to, using dynamic search groups, the captured biometric can be added to a blacklist based on a similarity measure, which is illustrated in FIG. 2C. Accordingly, when the authentication fails (step 216) centralized computer 120 compares the similarity measure generated in step 212 using the captured and trusted biometrics to another similarity measure threshold (step 240). To avoid inadvertently adding a captured biometric to a blacklist due to, for example, the authorized person having a temporary affliction affecting his/her voice or a bad quality capture, the other similarity measure threshold can be set lower than the similarity measure threshold used for authentication in step 214. Accordingly, when centralized computer 120 determines that the similarity measure is greater than or equal to the other similarity measure threshold ("No" path out of decision step 240), then no further action is taken (step 244). If, however, centralized computer 120 determines that the similarity measure is less than the other similarity measure threshold ("Yes" path out of decision step 240), then centralized computer 120 can add the captured biometric to a blacklist (step 242).

The captured biometric can then be used in the dynamic search group process of FIG. 2B, and if there is a match then the captured biometric can be added to the blacklist along with an identification of the matching person from the dynamic search group. Further, a variety of different entities can be notified of the fraudulent activity, such as the proper authorities, the authentic person, the requesting information user 130, other information users 130 having a relationship with the authentic user, and/or information sources 100. These notifications can include a variety of attributes, including biometric and non-biometric information (e.g., an electronic mail address of the fraudster, which in this case would be the person to be authenticated). Additionally, the biometric and/or non-biometric information from the fraudster can be used as part of a cascaded search in which this information is compared to other information received by centralized computer 120 from information sources 100 in order to identify other instances of potential fraud. Thus, for example, the ANI of the telephone number used by the fraudster can be compared to telephone numbers associated with other persons, which may then identify other instances in which the fraudster, using the same telephone number, conducted transactions and/or authentications posing as the other persons.

Figure 2D:
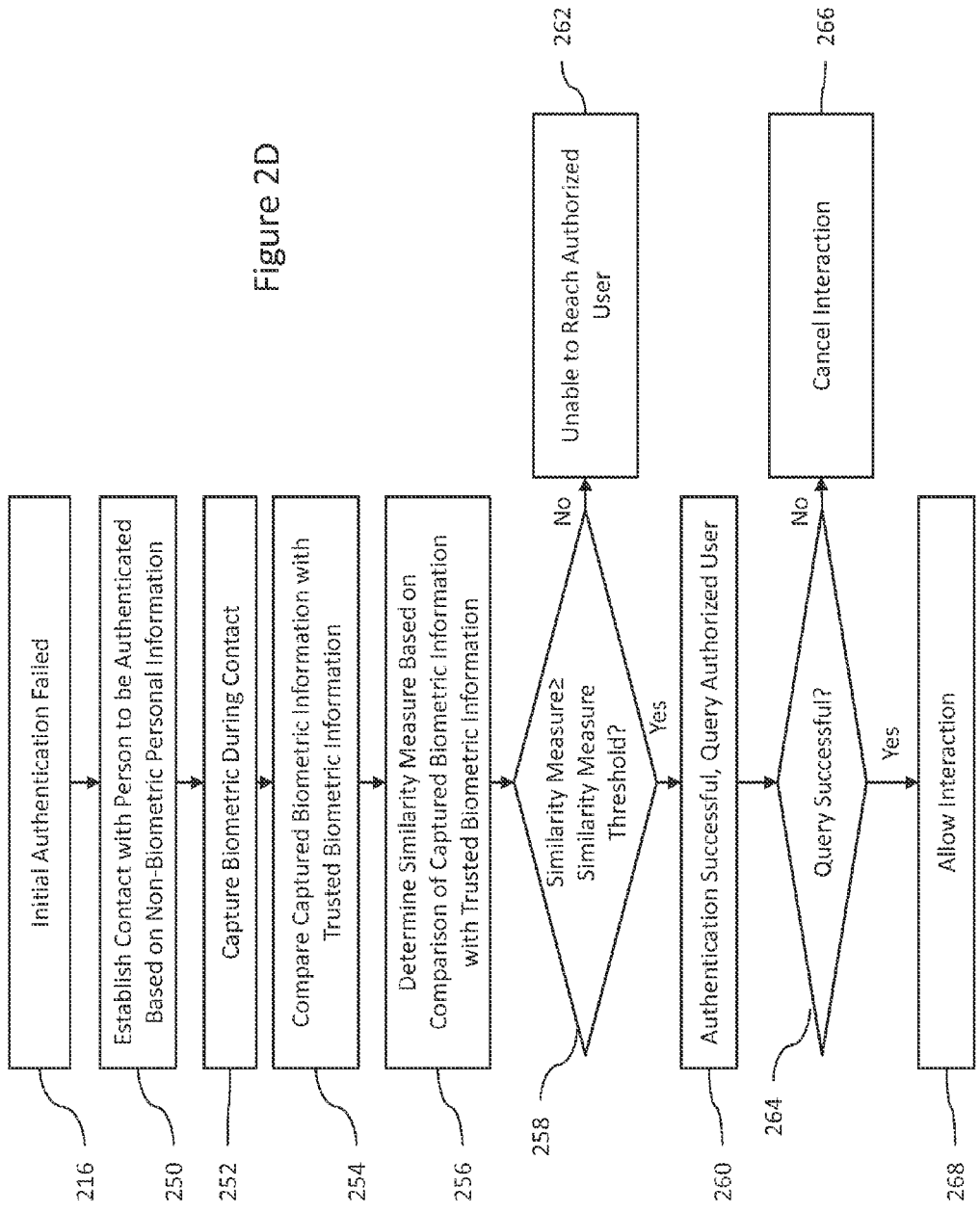

FIG. 2D is a flow diagram illustrating an exemplary method that is performed when the initial authentication failed. When the initial authentication failed (step 216), the centralized computer 120 establishes contact with the person to be authenticated using on non-biometric personal information (step 250). For example, the person to be authenticated can be contacted by telephone using a telephone number derived from the account record, automatic number identification (ANI), or other non-biometric personal information. The centralized computer 120 can capture biometric information is during the contact (step 252). For example, assuming that the biometric captured in step 210 was based on a telephone call to the customer service operations of the entity operating the centralized computer 120 or of an information user 130, an operator or interactive voice response (IVR) system asks the person answering the contact whether they are on the phone with the customer service operations and whether they have the same "name" that was supplied during the contact of step 210. The response to this inquiry is used as the captured biometric in step 252.

The centralized computer 120 compares the captured biometric information with the trusted biometric information (step 254) to determine a similarity measure (step 256). Again, the trusted biometric information can be one or both of the first and second historical biometric information and/or a composite of the first and second historical biometric information. When the centralized computer 120 determines that the similarity measure is greater than or equal to a similarity measure threshold ("Yes" path out of decision step 258), then the authentication is successful and the authorized user is asked whether they are currently connected to customer service. If the authorized user indicates that they are not connected to customer service ("No" path out of decision step 264), then the interaction is canceled (step 266). If, however, the authorized user indicates that they are connected to customer service ("Yes" path out of decision step 264), then the interaction is allowed to proceed (step 268). In this case the centralized computer 120 can add the captured biometric received in step 208 to a blacklist because the matching of the biometrics with the outbound contact in step 250 provides assurances that the biometric captured from the outbound contact is received from the actual person to be authenticated.

When the centralized computer 120 determines that the similarity measure is less than a similarity measure threshold ("No" path out of decision step 258), then it is determined that the authorized user was not reachable (step 262). Step 262 could also involve adding one or more captured biometrics to a blacklist, either automatically or based upon additional processing. Specifically, the failure of both of the biometric comparisons of steps 210 and 254 indicates that both biometrics are possibly fraudulent. Accordingly, both biometrics could be compared to each other determine whether there is a match, and if there is a match then both biometrics can be compared to a blacklist and added to the blacklist if there is a matching biometric. If, however, there is not a match between the biometrics of steps 210 and 254, then the biometric of step 210 is likely fraudulent and can be added to a blacklist. Further investigation can also be performed to attempt to identify whether one or both of the captured biometrics is from a fraudster, which may require human intervention. Additionally, any action relating to an inbound contact from which the biometric is captured in step 208 can be suspended. The similarity measure threshold used for the comparison in the method illustrated in FIG. 2D can the same or a different similarity measure threshold to those used in the initial authentication of FIG. 2A or the trust establishment of FIG. 3A.

A method similar to that illustrated in FIG. 2D can also be used for high-risk transactions, which will now be described in connection with FIG. 2E. Those skilled in the art will understand that there are a variety of ways of identifying a particular transaction as a high-risk transaction, such as by using a predictive model with a score above a risk threshold (e.g., a Falcon fraud score from Fair, Isaac), and/or a predictive model derived from transaction data, biometric and/or non-biometric information. Other ways of identifying a particular transaction as a high risk transaction include the transaction being above a certain amount (e.g., above $2,000) when other purchases by the person have been much lower, a transaction occurring in a different geographic location from where a person normally makes transactions (e.g., a different state or country), the particular transaction occurring within a short period of time of a previous transaction, and/or the like. The present invention is equally applicable to any manner of identifying a high-risk transaction. The term transaction should be understood in its broadest sense to include all types of transactions including, but not limited to, purchases and changes to biometric and/or non-biometric information (e.g., changing a mailing address, contact telephone number, etc.)

First, it should be noted that the method of FIG. 2D is a continuation of the method of FIG. 2A in which a person to be authenticated can, for example, make an inbound call to the centralized computer 120 for authentication, whereas the method FIG. 2E assumes that a trusted biometric has been established (steps 202-206 of FIG. 2A) but does not require the inbound call processing of steps 210-218 of FIG. 2A. Thus, the method of FIG. 2E can be started after steps 202-206 of FIG. 2A have been performed to establish the trusted biometric. When a high-risk transaction is identified (step 249), then the centralized computer 120 establishes contact with the person to be authenticated (step 250). The person to be authenticated can be contacted by telephone using a telephone number derived from the account record, automatic number identification (ANI) if this is provided by an information user 130 that is currently engaged in a call with the person attempting the high-risk transaction, or other non-biometric personal information. The person receiving this outbound contact is asked whether they are the authorized user for the account. If not, the contact is disconnected and another outbound contact is attempted using an alternate contact. For example, the first contact may be to the authorized user's home telephone number and the authorized user's spouse, who is not authorized, answers the telephone. In this case, the spouse would respond that they are not the authorized user, and then the authorized user's mobile telephone number would be used as the alternative way to contact the authorized user. If the authorized user cannot be contacted then the high-risk transaction may be denied and the processing ends. If, however, the person answering the contact indicates that they are the authorized user, then biometric information is captured during the contact from the person purporting to be the authorized user (step 252). Steps 254, 256, and 258 are performed in a similar manner to that discussed above in connection with FIG. 2D.

Like the method of FIG. 2D, if the centralized computer 120 determines that the similarity measure of comparison of the captured and trusted biometrics is greater than or equal to the similarity measure threshold ("Yes" path out of decision step 258), then the authentication is successful because it has been determined that the person answering the contact is the authorized user. In contrast to the method of FIG. 2D, when the biometric comparison is less than the similarity threshold ("No" path out of decision step 258), then the captured biometric is automatically added to the blacklist (step 262A). Further, unlike the method of FIG. 2D, when the authentication is successful, the authorized user is asked, for example, whether they made a particular purchase or change in biometric and/or non-biometric information (step 260A). If the authorized user indicates that they did not make a particular purchase ("No" path out of decision step 264A), then the transaction is canceled (step 266). If, however, the authorized user indicates that they did make the particular purchase ("Yes" path out of decision step 264A), then the transaction is allowed to proceed (step 268A).

For cost and efficiency reasons the contact established with the person to be authenticated in step 250 and for the query of step 260A is preferably automated. Further, although this contact was described as being performed by telephone, the contact could also be made using an electronic mail or text message with a link to a browser-based application to perform the same functions. Similarly, if the person to be authenticated has a mobile application, such as the one described below in connection with FIGS. 4-5B, then the contact can be made by making the contact with the mobile application.

Although FIGS. 2D and 2E illustrate the capturing of the biometric and querying the user as separate, sequential steps, the biometric can be captured as part of the query. In this case the determinations of steps 258 and 264 or 264A can be performed simultaneously and only a positive result of both determinations will result in the transaction or interaction being allowed to proceed. The querying of the authorized user in steps 260 and 260A of FIGS. 2D and 2E respectively can include questions in addition to whether the person is currently connected to customer service or whether the person has made the high risk transaction. These additional questions can be based upon non-biometric personal information, such as those described below in connection with FIG. 3C. In this case, the determination of whether the query is successful in steps 264 and 264A would also involve determining that all of the questions have been answered correctly.

Although FIGS. 2A-2E illustrate the authentication being performed based solely on a comparison between a trusted biometric and a stored biometric, other information can be employed as part of the authentication. For example, additional, non-biometric personal information can be received along with the captured biometric information, and authentication can be based on whether the similarity measure is greater than or equal to the similarity measure threshold and whether the additional, non-biometric information matches other non-biometric information that was previously received from information sources 100. Another factor that can be employed is whether a person has been in good standing with one of the information sources 100 for a predetermined period of time.

The authentication technique described above in connection with the flow diagram of FIG. 2A assumes that a trusted biometric is established prior to the authentication of a captured biometric. However, when a trusted biometric is not available prior to the authentication and a historical biometric is available, the historical biometric can be determined as trusted as part of the authentication. Specifically, the centralized computer 120 compares the historical biometric to a captured biometric (step 210) and determines a similarity measure based on this comparison (step 212). When the centralized computer 120 determines that the similarity measure is greater than a similarity measure threshold ("Yes" path out of decision step 214), then the authentication is successful (step 218) and the historical biometric is determined to be a trusted biometric. In this case, the similarity measure threshold may be higher than when using a trusted biometric for authentication due to the fact that the historical biometric was not previously determined to be trusted. Furthermore, other information can be employed as part of the authentication, such as whether additional, non-biometric information received from the person matches other non-biometric information that was previously received from information sources 100. Another factor that can be employed is whether a person has been in good standing with one of the information sources 100 for a predetermined period of time.

Figure 3A:
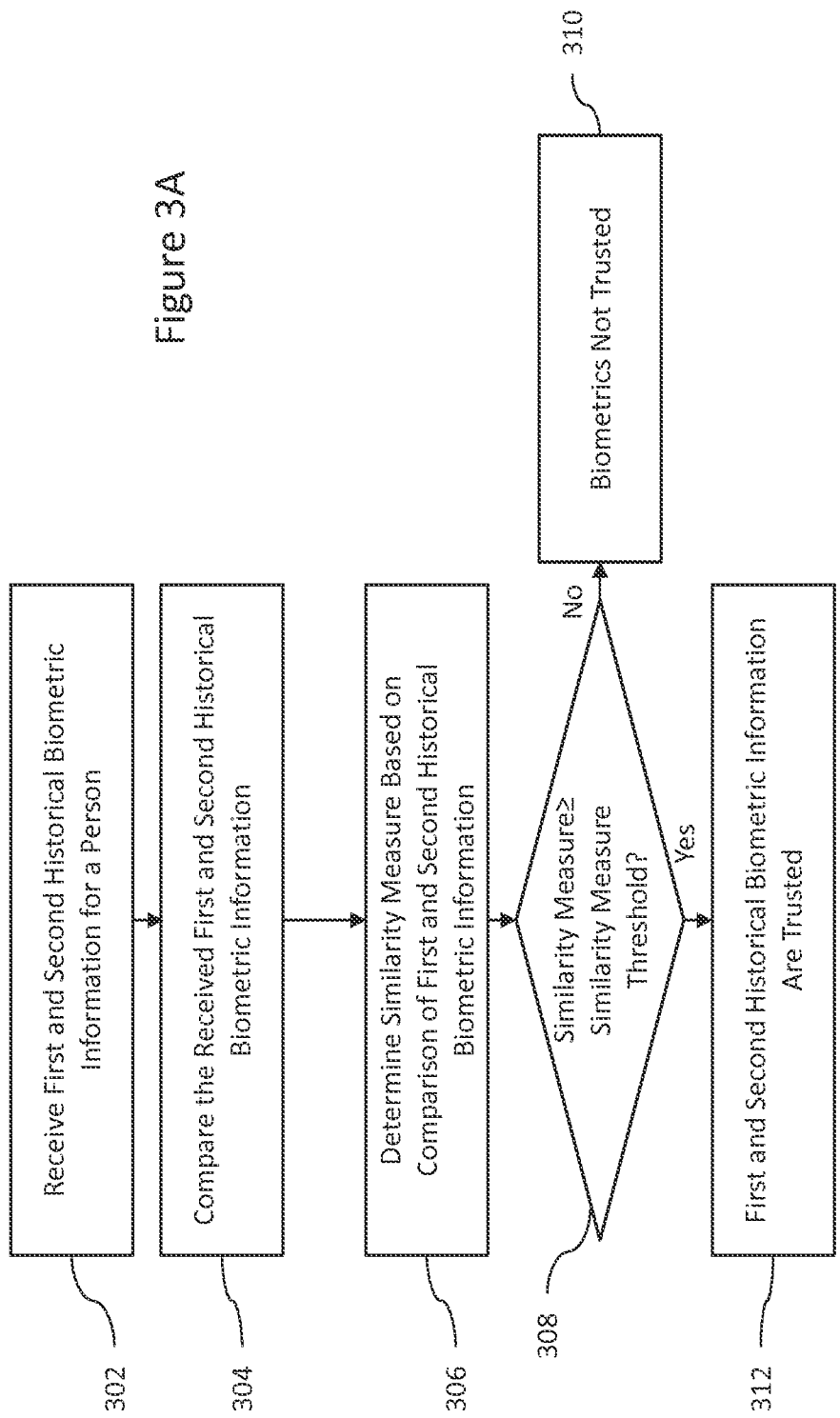
Figure 3B:
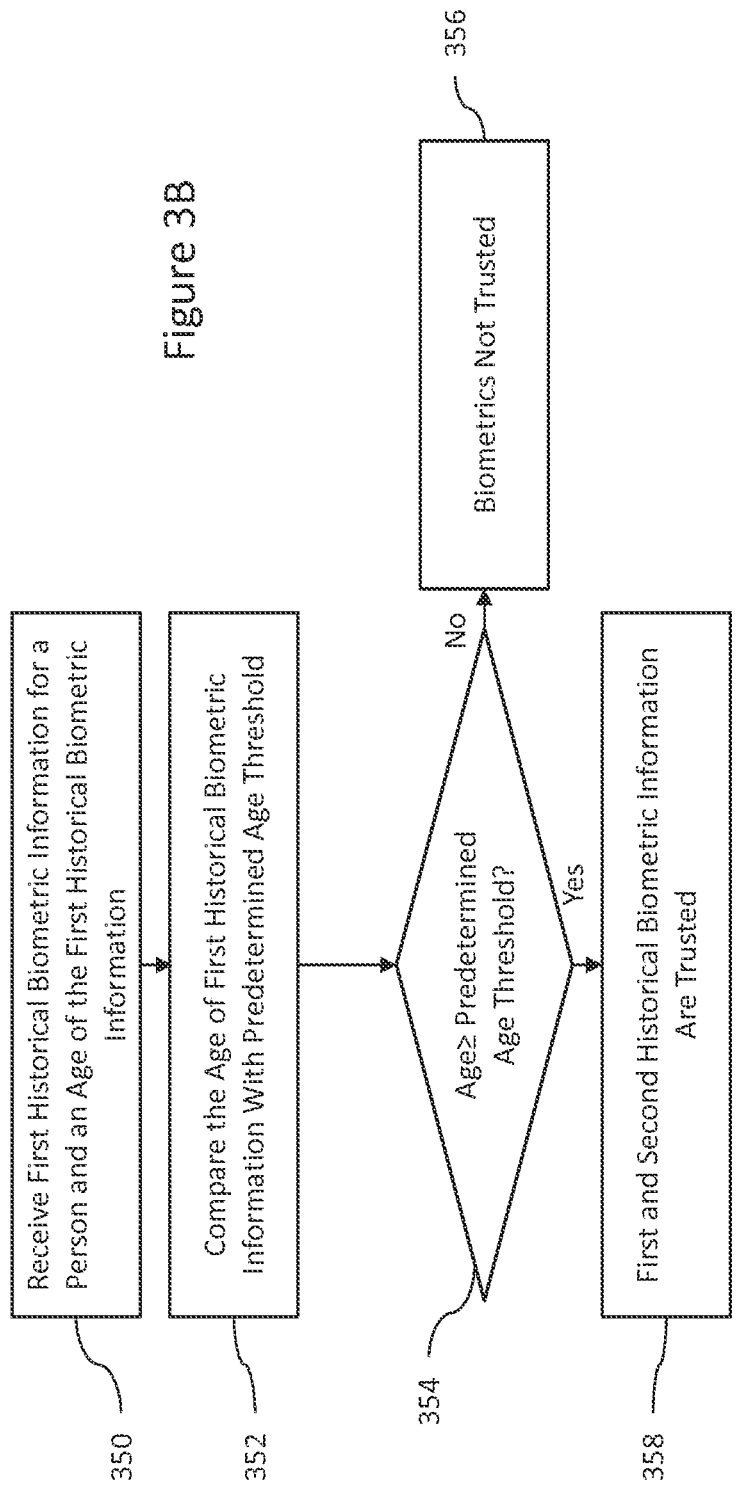

FIGS. 3A and 3B are flow diagrams of exemplary methods for identifying historical biometric information as trusted biometric information. The method of FIG. 3A employs a comparison of historical biometric information to establish trusted biometric information and the method of FIG. 3B establishes trusted biometric information based on the age of the biometric information. Turning first to FIG. 3A, the centralized computer 120 receives first and second historical biometric information for a person (step 302) and compares this information (step 304). Ideally the first and second historical biometric information are originally provided by different, independent information sources. The centralized computer 120 then determines a similarity measure based on the comparison (step 306). When the centralized computer 120 determines that the similarity measure is less than a similarity measure threshold ("No" path out of decision step 308), then the first and second biometric information cannot be determined as trusted at this time (step 310). However, based upon future processing, the first and second historical biometric information may be determined as trusted at a later time. This future processing can involve, for example, determining whether the account is in good standing for a predetermined period of time corresponding to the age of one of the first and second historical biometric information in accordance with the method illustrated in FIG. 3B.

Depending upon the amount of variance between the first and second biometric information other actions can be taken when it is determined that the first and second historical biometric information cannot be trusted. For example, if the similarity measure is significantly small (i.e., the biometrics are highly dissimilar) it may be determined that one of the first and second historical biometric information was likely produced by a fraudster. In this case, if additional historical biometric information is available from an information source that is different than information source(s) that provided the first and second historical biometric information, the additional historical biometric information can be compared to both the first and second historical biometric information to determine whether it matches. Because the additional historical biometric information is obtained from a source that is different and independent from the source(s) that provided the first and second historical biometric information there is a high probability that the matching historical biometric information was captured from the actual person and the non-matching historical biometric information was captured from a fraudster. Accordingly, the centralized computer 120 can inform the information source that provided the non-matching historical biometric information that it is likely from a fraudster and/or include it in a blacklist. Indeed, anytime an anomaly is detected using any of the methods described herein an information source that provided the non-matching biometric or non-biometric personal information can be informed of the anomaly. Similarly, other information sources 100 or information users 130 can be informed of the anomaly.

If the centralized computer 120 determines that the similarity measure is greater than or equal to the similarity measure threshold ("Yes" path out of decision step 308), then the first and second historical biometric information is considered to be trusted biometric information that can be used for future authentication procedures.

Turning now to FIG. 3B, the centralized computer 120 receives first biometric information for a person along with an age of the biometric information (step 350). The age can either be an absolute value indicating the age, e.g., a number of days, years, etc., or the age can be an indication of the date on which the historical biometric was captured. The age of the historical biometric information is then compared to a predetermined age threshold. If the centralized computer 120 determines that the age of the historical biometric information is less than the predetermined age threshold ("No" path out of decision step 354), then the biometric cannot be trusted at this time (step 356). However, based upon future processing the first historical biometric information may be determined as trusted at a later time. This future processing can involve, for example, using a second historical biometric information that is received at a later time in accordance with the method illustrated in FIG. 3A.

It should be appreciated that the similarity measure thresholds used in the methods illustrated in FIGS. 3A and 3B can be static or dynamic. Thus, for example, the same similarity measure threshold (i.e., a static threshold) can be used regardless of the source of the biometric information. Alternatively, the similarity measure threshold can be adjusted based upon additional information. For example, if the centralized computer 120 receives information that a particular person has opened a certain number of new accounts with different information sources 100 within certain period of time the similarity measure threshold may be set higher than if the particular person has not. The reason for this is that opening a number of new accounts within a short period of time is an indicator of fraud. It will be recognized that any number of different factors can be accounted for to adjust the similarity measure threshold for identifying a trusted biometric for a particular person.

The methods of FIGS. 3A and 3B establish a trusted biometric using historical biometric information received by the centralized computer. However, there may be instances in which there is no historical biometric information available to the centralized computer to establish a trusted biometric. In these instances the method illustrated by the flow diagram of FIG. 3C can be employed to establish trusted biometric information. Specifically, when the centralized computer 120 determines that there is no available historical biometric information for a particular person (step 360), then non-biometric personal information is obtained by the centralized computer 120 from one or more information sources 100. Next, the centralized computer 120 contacts the person for which a trusted biometric is to be established and answers to questions related to the obtained non-biometric personal information are solicited (step 364). The manner of contacting the person should involve the ability to obtain biometric information from the person. For example, the contact can be by telephone, voice or video chat, and voice biometric information can be collected. The centralized computer 120 compares the answers provided by the person with the stored non-biometric personal information (step 366) to determine whether all answers are correct (step 368).

When the centralized computer 120 determines that not all of the answers are correct ("No" path out of decision step 368), then the biometric information captured during the contact cannot be trusted at this time (step 370). Various actions can be taken following this determination, such as adding the biometric to a blacklist, storing the biometric as a historical biometric for future processing (e.g., to identify trusted biometrics), and/or notifying the information source that provided the information for which the incorrect answer was provided. When the centralized computer 120 determines that all of the answers are correct ("Yes" path out of decision step 368), then the biometric information captured during the contact can be identified as trusted (step 372).

The method of FIG. 3C can also be employed using a mobile application, such as the one described below in connection with FIGS. 4-5B. Specifically, the mobile application can capture the biometric and compare it to a trusted, stored biometric. This comparison can be performed on the device executing the mobile application or on the centralized computer 120. For reduced latency or if connectivity issues between the mobile application and the centralized computer 120 are anticipated, then the biometric may be encrypted and cached on the device so that the biometric comparison can be performed within the mobile application. If, however, there is no trusted, stored biometric then in accordance with the method of FIG. 3C the mobile application would ask the questions and obtain the answers to authenticate the user's identity. A positive authentication, i.e., the person answers all of the questions correctly, would result in the captured biometric being identified as a trusted biometric, which can then be sent to the centralized computer 120 for future authorizations.

The level of security obtained using the method illustrated by the flow diagram of FIG. 3C is increased when the non-biometric personal information that is used to solicit the answers to questions is obtained from more than one information source compared to if this information is obtained from a single information source. The level of security can be further increased if one or more of the questions are based the same type of information obtained from different information sources. Another way to further increase the level of security would be to use private, non-public data that would generally only be known by one of the information sources 100 or information users 130, such as historical purchase information made by a particular credit card.

The methods illustrated in FIGS. 2A-2E are simple uses of trusted biometric information for authentication. Biometric information determined as trusted, for example using the methods illustrated in FIGS. 3A-3C, can be employed in other types of scenarios, such as to generate a single-use password, which will be described below in connection with FIG. 4, to establish a temporary account, which will be described below in connection with FIGS. 5A and 5B, and/or for voting, which will be described below in connection with FIG. 6.

Figure 4:
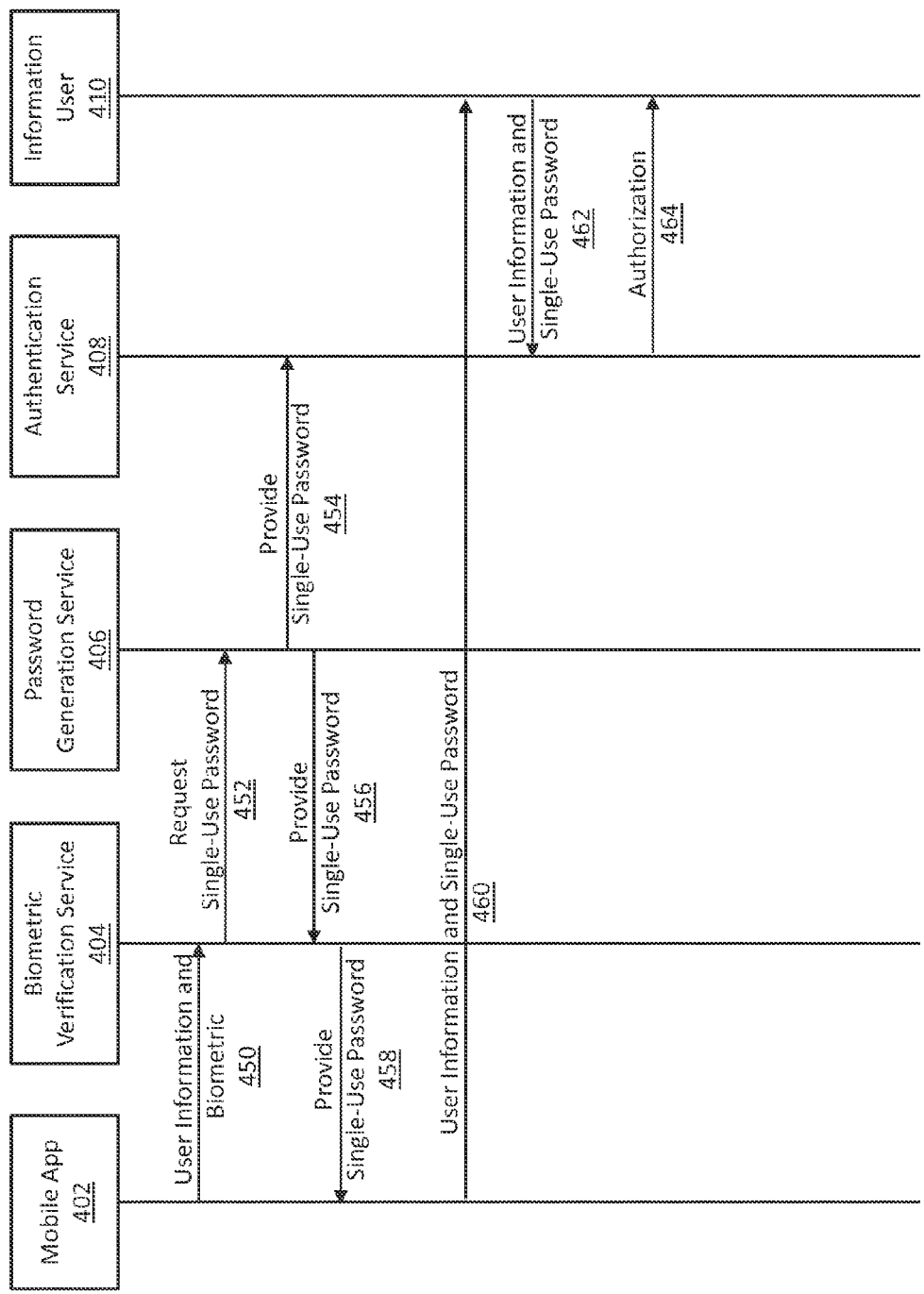
FIG. 4 is a ladder flow diagram of an exemplary method of using trusted biometric information to generate and employ single-use passwords in accordance with the present invention.

FIG. 4 is a ladder flow diagram of an exemplary method of using trusted biometric information to generate and employ single-use passwords in accordance with the present invention. A consumer that desires to employ a single-use password has a device that includes a mobile application 402. However, it should be recognized that this is merely exemplary and the device need not be a mobile device but can be a non-mobile device, in which case the application would not be a mobile application. Accordingly, the consumer opens the mobile application 402 and requests a single-use password. The mobile application 402 requests the user to provide biometric information. After receiving the biometric information the mobile application 402 transmits the biometric information along with other user information to a biometric verification service 404 (step 450). The biometric verification service 404 compares the received biometric information with trusted biometric information and if there is sufficient similarity a request for a single-use password is sent to password generation service 406 (step 452). The comparison of biometric information can be performed in the manner described above in connection with FIG. 2.

Password generation service 406 then generates a single-use password and provides it to authentication service 408 (step 454) and biometric verification service 404 (step 456). Although FIG. 4 illustrates password generation service 406 providing the single-use password first to authentication service 408 and then biometric verification service 404, these can be performed in the opposite order or simultaneously.

Biometric verification service 404 then provides the single-use password to the mobile application 402 (step 458). The consumer can then use the mobile application to initiate a transaction by providing user information and the single-use password to an information user 410 (step 410). The information user 410 then sends the user information and single-use password to authentication service 408 (step 462) and upon successful authentication the authentication service returns an authorization response to the information user 410 (step 464).

The content of the authorization response and further processing depends upon the desired use of the single-use password. For example, the single-use password can be employed for account access, in which case the authorization merely indicates that the single-use password has been authenticated and the information user 410 can then allow the user of the mobile application 402 to access an account of information user 410. Similarly, the single-use password can be used with a conventional browser on a personal computer or mobile device in connection with a website, such as an electronic commerce merchant. In another example the single-use password can be employed when the consumer operating the mobile application 402 does not have a pre-existing account with information user 410. In this case the authentication response can include information about the consumer, such as name, account, mailing address, electronic mail address, telephone number(s), single-use account number, and/or the like. The information user can then employ the information about the consumer to populate its databases to establish an account for the consumer. In yet another example, which is related to the previous example, the single-use password can be employed when the consumer operating the mobile application 402 is applying for a credit facility (e.g., a credit card or loan). In this case the authorization response could include additional personal information, such as a social security number and previous mailing addresses. In any of the examples above the information user 410 can also request additional information beyond that provided with the authorization response.

Although the method illustrated in FIG. 4 was described as providing a single-use password, the method could also be employed for translating user names and/or passwords for registering with an information user 410. Thus, for example, a person's actual personal information, such as telephone number, mailing address and/or personal details used for password recovery or verification (e.g., mother's maiden name), can be stored by the authentication service 408 and the information user 410 would only retain the single-use username and password. If desired, information user 410 could store dummy information provided by the centralized computer instead of the user's actual personal information. This is particularly useful for protecting a person's personal information in the case of a data breach of the information user's systems. It also protects the person from being tracked and profiled for marketing purposes.

Although the method has been described as the mobile application providing the user information and single-use password to the information user, this need not be the case. Rather, the user can use a different application to provide this information or can provide the single-use password completely independently of the device on which the mobile application is being executed, e.g., by entering the single-use password into an automated teller machine (ATM) or by entering the single-use password into a web form using a browser. Thus, it should be recognized that the term password as used herein should be understood to encompass both alpha-numeric passwords as well as purely numerical passwords, such as ATM personal identification numbers (PINs).

In the method described above in connection with FIG. 4 the biometric verification service 404, password generation service 406, and authentication service 408 can be services performed by centralized computer 120. Alternatively, the biometric verification service 404 and authentication service 408 can be services performed by centralized computer 120 and the password generation service 406 can be performed by a distinct entity.

Figure 5A:
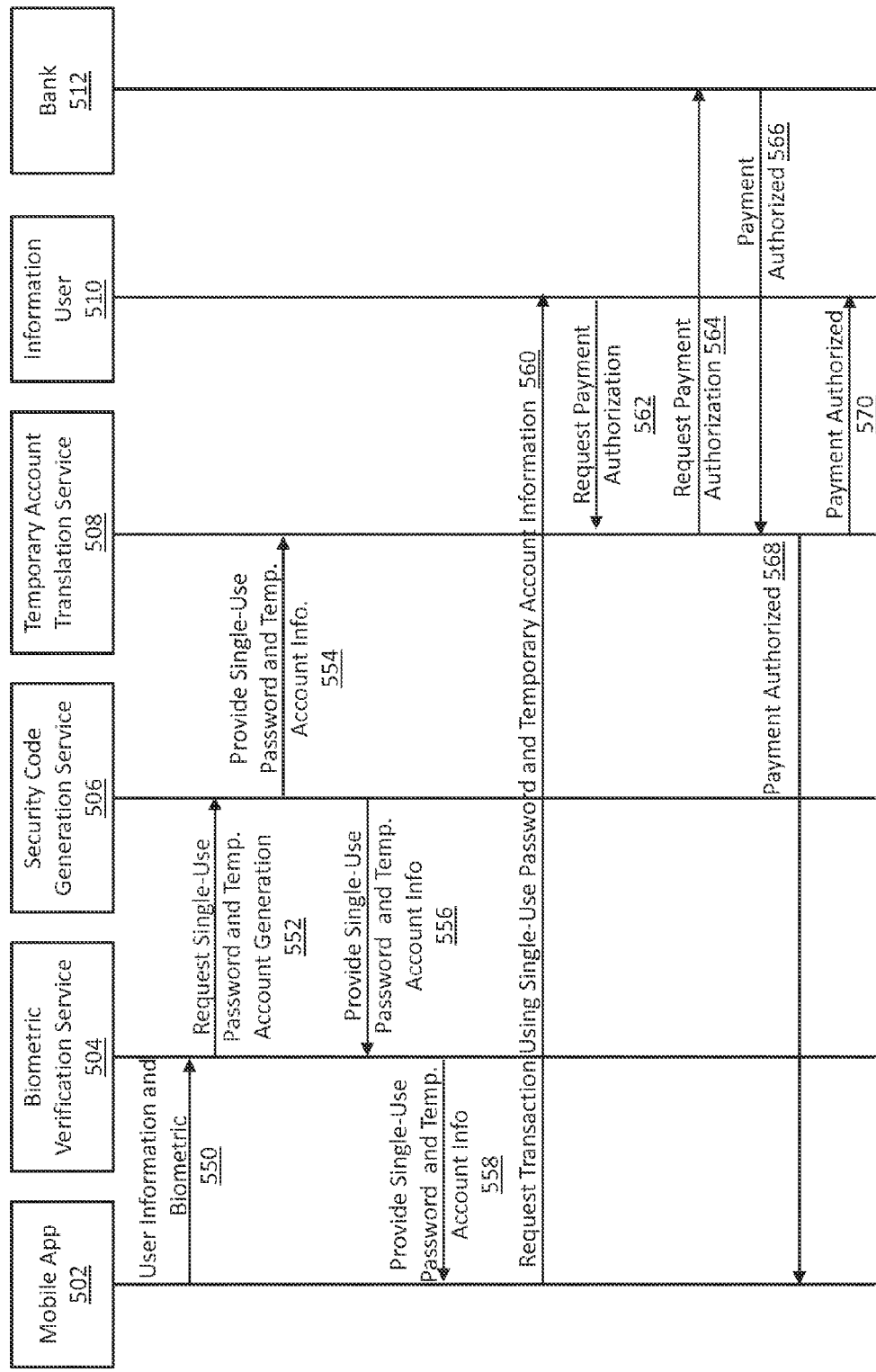
FIGS. 5A and 5B are ladder flow diagrams of an exemplary method of using trusted biometric information to generate temporary accounts in accordance with the present invention.

FIG. 5A is a ladder flow diagram of an exemplary method of using trusted biometric information to generate temporary accounts in accordance with the present invention. The temporary accounts are associated with actual accounts, and the temporary account number is translated into actual account number for payment processing. The temporary account numbers can take a variety of different forms, including an arbitrary account number that is not related to the associated actual account number, a combination of the actual account number and an arbitrary credit verification value that is not related to a credit verification value of the associated actual account number, an arbitrary credit verification value when the associated actual account number does not have an actual credit verification value, etc.

A consumer that desires to employ a temporary account number has a device that includes a mobile application 502. The mobile application 502 can be, for example, an application designed for a particular merchant or can be one that is designed solely to obtain the temporary account information. However, it should be recognized that this is merely exemplary and the device need not be a mobile device but can be a non-mobile device, in which case the application would not be a mobile application. Accordingly, the consumer opens the mobile application 502 and requests a temporary account number. The mobile application 502 requests the user to provide biometric information. After receiving the biometric information the mobile application 502 transmits the biometric information along with other user information, including a payment account number, to a biometric verification service 404 (step 550). The payment account number can be previously stored in the device and/or the application, or the user can be prompted to provide the payment account number each time this process is performed. Further, the payment account number can be centrally stored with the temporary account translation service 508. The biometric verification service 504 compares the received biometric information with trusted biometric information and if there is sufficient similarity a request for a single-use password and temporary account number is sent to security code generation service 506 along with the payment account information (step 552). The comparison of biometric information can be performed in the manner described above in connection with FIG. 2.

Security code generation service 506 then generates a single-use password and temporary account number and provides this information along with the payment account information to temporary account translation service 508 (step 554) and to the biometric verification service 504 (step 556). Temporary account translation service 508 can be, for example, a payment network such Visa, MasterCard, American Express, Discover, etc. Temporary account translation service 508 stores the correspondence between the payment account information, which as will be described below, is used to receive the temporary account information from an information user 510, such as a merchant, and then provide the actual account information and transaction amount to an institution associated with the payment account information, such as bank 512. Although FIG. 5A illustrates security code generation service 506 providing the single-use password and temporary account information first to temporary account translation service 508 and then biometric verification service 504, these can be performed in the opposite order or simultaneously.

The biometric verification service 504 forwards the single-use password and temporary account information to the mobile application (step 558). The user of mobile application 502 can then employ the temporary account information to pay for a transaction with an information user 510, such as a merchant. Accordingly, mobile application 502 sends a transaction request that includes the single-use password and temporary account information to information user 510 (step 560). If mobile application 502 is designed solely to obtain the temporary account information then the transaction request that includes the single-use password and temporary account information can be manually entered by the user into the merchant's own form, such as a website form. Information user 510 then sends a request for payment authorization to temporary account translation service 508 that includes the single-use password and temporary account information (step 562). Temporary account translation service 508 verifies the single-use password and temporary account information and forwards a request for payment authorization that includes the actual account number and security code (e.g., CVV) that was translated from the temporary account number to bank 512 (step 564). The request for payment authorization can be transmitted either directly to the bank 512 or transmitted via a payment network. Bank 512 determines whether there are sufficient finds, and if so returns a payment authorization to the temporary account translation service 508 (step 566). This can be sent directly to the temporary account translation service 508 or via a payment network. The temporary account translation service 508 then informs the mobile application 502 and information user 510 that the payment was authorized (steps 568 and 570).

Although FIG. 5 illustrates temporary account translation service 508 informing mobile application 502 that the payment has been authorized (step 568) before informing the information user 510 (step 570), these can be performed in the opposite order or simultaneously. Further, instead of the bank 512 informing temporary account translation service 508 that the payment has been authorized, the bank 512 can forward this to a payment network, which can then inform the information user 510 and/or mobile application 502. This use of the payment network can also be modified so that the payment network informs the information user 510 that the payment has been authorized and the information user 510 can then inform the mobile application 502.

In the method described above in connection with FIG. 5 the biometric verification service 504, the generation of the single-use password by the security code generation service 506, and/or the generation of the temporary account information by the security code generation service 506 can be services performed by centralized computer 120. Alternatively, the biometric verification service 504 and the generation of the single-use password by security code generation service 506 can be performed by centralized computer 120 and the generation of the temporary account information by the security code generation service 506 can be performed by a distinct entity, such as a payment network. This payment network can be the same or different from the payment network that supports the temporary account translation service 508.

Certain embodiments of the method described above in connection with FIG. 5A assumed that the temporary account translation service could be a payment network. The present invention is not limited to using a payment network as a temporary account translation service. Rather, the temporary account translation service can be operated by any entity, which acts as a buffer to protect a person's actual account details from an information user. This is particularly useful when the information user is not familiar to the person and thus the person does not want to disclose the actual account details to the information user. FIG. 5B is a ladder flow diagram of an exemplary method for using trusted biometric information to generate temporary accounts in accordance with the present invention in which the temporary account translation service is not a payment network, and instead of the manner of payment being a credit card transaction the manner of payment is an Automated Clearinghouse (ACH) transaction. This can be performed by directly accessing the ACH or an ACH processor can be employed. In this case the temporary account translation service would translate the temporary account information into a routing number for the bank from which the funds are being drawn and the account number for the person's checking, savings, or investment account.

Figure 5B:
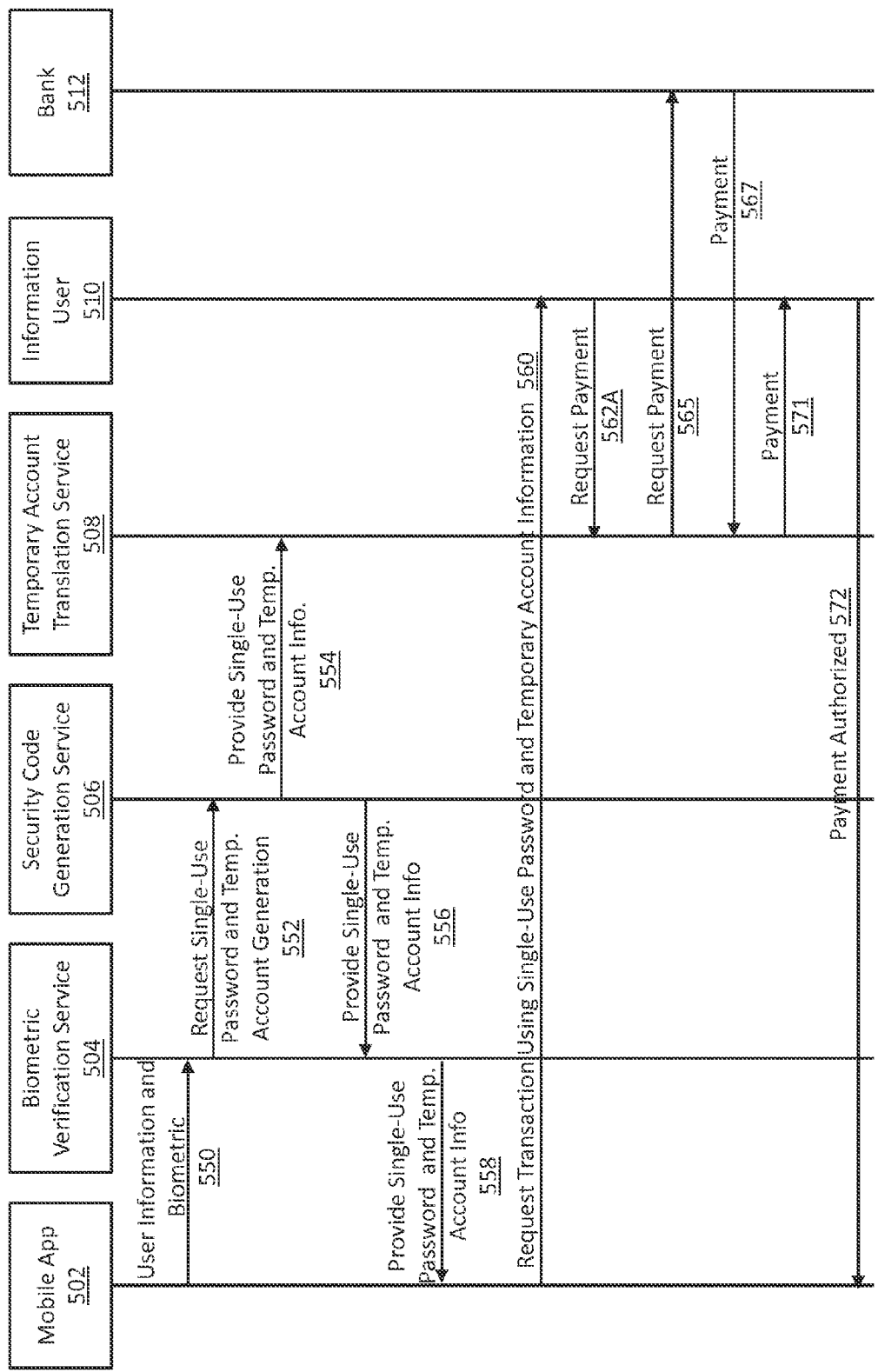

Steps 550-560 in FIG. 5B are the same as the corresponding steps in FIG. 5A. Accordingly, when an information user 510 receives a request for a transaction that includes a password and temporary account information (step 560), the information user 510 sends a request for payment to the temporary account translation service 508 that includes the password and temporary account information (step 562A). Temporary account translation service 508 determines whether the password matches the stored password for the temporary account, and if there is a match the temporary account translation service 508 sends a request for payment, such as an ACH request, to bank 512 (step 565). This request for payment will include any information that is normally employed for authorizing an ACH payment request. If the ACH payment request is authorized, the bank 512 withdraws the funds from the person's checking, savings, or investment account and sends the payment to the temporary account translation service 508 (step 567). It should be recognized that although ACH transactions can be performed in real-time, in many cases they are not. Accordingly, the transmission of the payment to the temporary account translation service can be in real-time or may be delayed until the ACH transaction processing is completed. Temporary account translation service 508 then sends the payment to information user 510 (step 571), and information user 510 can then inform the person that the payment has been authorized (step 572).

Although the methods illustrated in FIGS. 5A and 5B are described as using the mobile application 502 for both obtaining the single-use password and temporary account number and delivering the single-use password and temporary account number to the information user 510, instead the mobile application 502 can be used for obtaining the single-use password and temporary account number and the user can then provide the single-use password and temporary account number to the information user 510 independent of the mobile application 502, such as by providing this information to an internet browser, a different application and/or providing this information directly to the information user 510 at its place of business or over the telephone.

Moreover, although FIGS. 5A and 5B are described with entity 512 as being a bank, this need not be the case. Rather, it could also be a payment network, such as Visa, MasterCard, American Express, Discover, etc.

Figure 6:
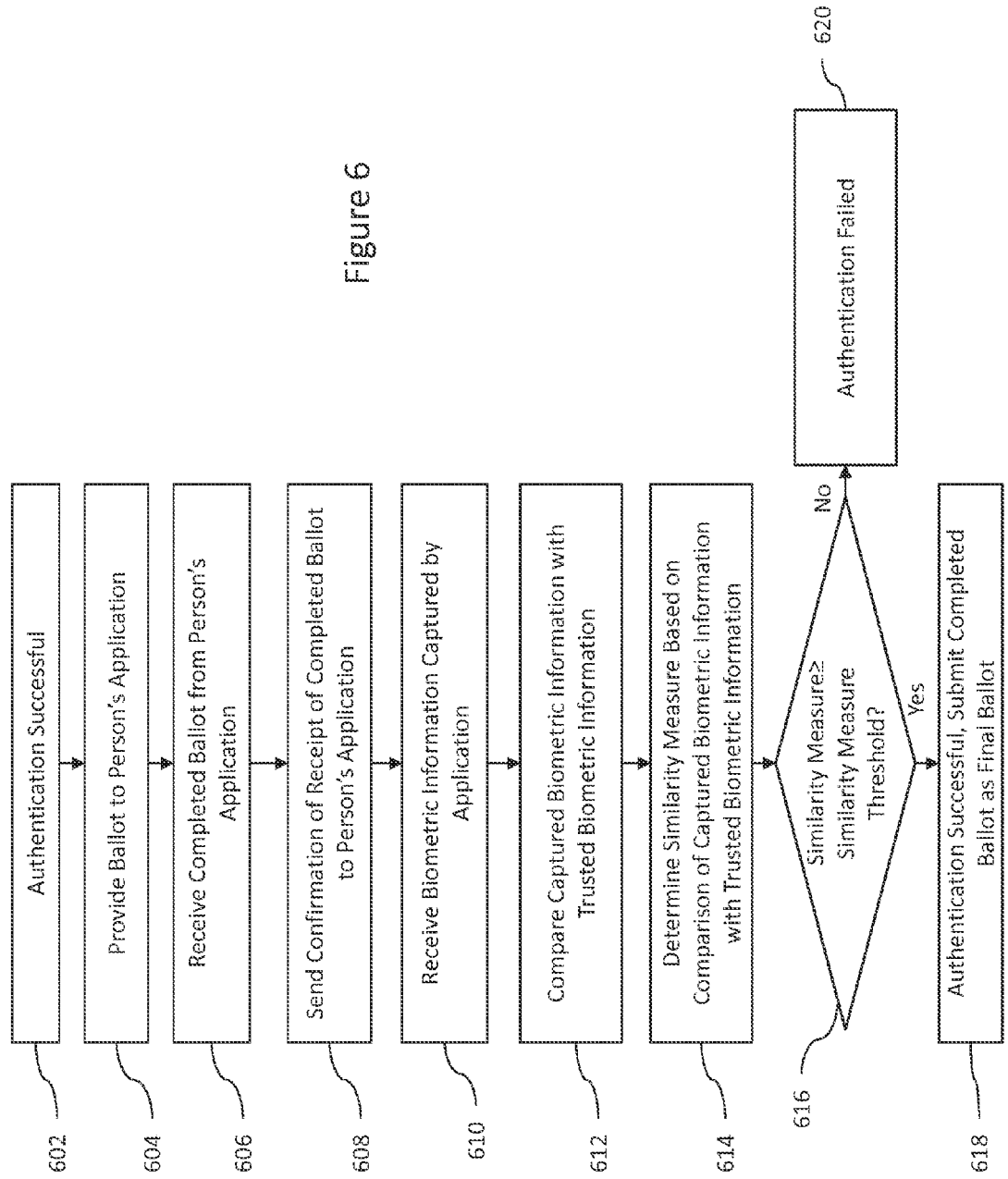
FIG. 6 is a flow diagram of an exemplary method for using trusted biometric information for voting in accordance with the present invention.

FIG. 6 is a flow diagram of an exemplary method for using trusted biometric information for voting in accordance with the present invention. This method assumes that the person has been authenticated using one of the techniques described above and has a device that executes an application, such as the mobile application described above. Further, the authentication techniques described above will involve authenticating the voter ID. For ease of description this application will be referred to below as the "person's application." After a person has been authenticated using one of the techniques described above (step 602) the centralized computer 120 provides the person's application with a ballot (step 604). Once the person has completed the ballot, the person uses the application to submit the completed ballot to the centralized computer (step 606) and the centralized computer sends a confirmation of receipt, which includes a summary of the votes cast by the person, to the person's application (step 608). If the summary of the votes cast are satisfactory the person's application requests that the person provide a biometric, which is captured by the application and provided to the centralized computer (step 610). If the summary of votes cast is not satisfactory then the person can correct and resubmit the ballot. The confirmation that the votes cast are satisfactory addresses the concern that the ballot can be hijacked between the person's application and the central voting server.

The centralized computer 120 compares the captured biometric information with trusted biometric information (step 612) and determines a similarity measure based on the comparison (step 614). When the similarity measure is greater than or equal to a similarity measure threshold ("Yes" path out of decision step 616), then the authentication is successful and the centralized computer 120 submits the completed ballot received from the person's application as a final ballot (step 618). When the similarity measure is less than the similarity measure threshold ("No" path out of decision step 616), then the authentication has failed. When the authentication fails, the person can be prompted to provide another biometric and the processing of steps 610-616 is repeated. Multiple authentication failures will require the person to manually vote at the local polling station.

The similarity measure threshold can be the same as those used for the initial authentication and/or identification of a trusted biometric. However, to provide an increased level of confidence that the ballot was submitted by an authorized person the similarity measure threshold used in step 616 can be higher than those used for the initial authentication and/or identification of a trusted biometric. Although the method illustrated in FIG. 6 is described as involving a communication directly between the centralized computer and the person's application, there may be another entity employed between these two. In this case the other entity would handle the provision, receipt, and submission of the ballot and the other entity would coordinate the authentication of the captured biometric information with the centralized computer 120.

Figure 7A:
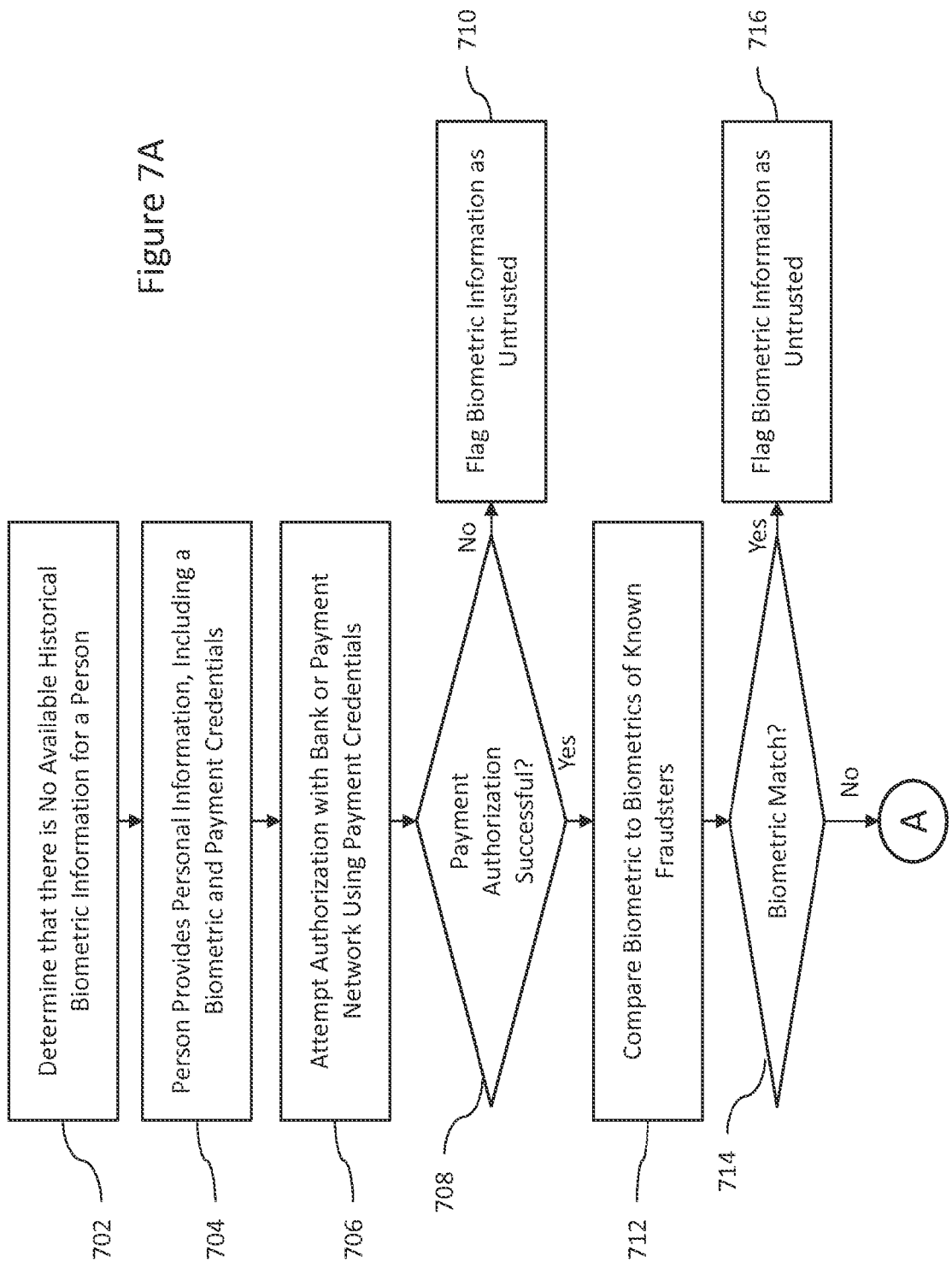
FIGS. 7A and 7B illustrate a flow diagram of another exemplary method for authentication.
Figure 7B:
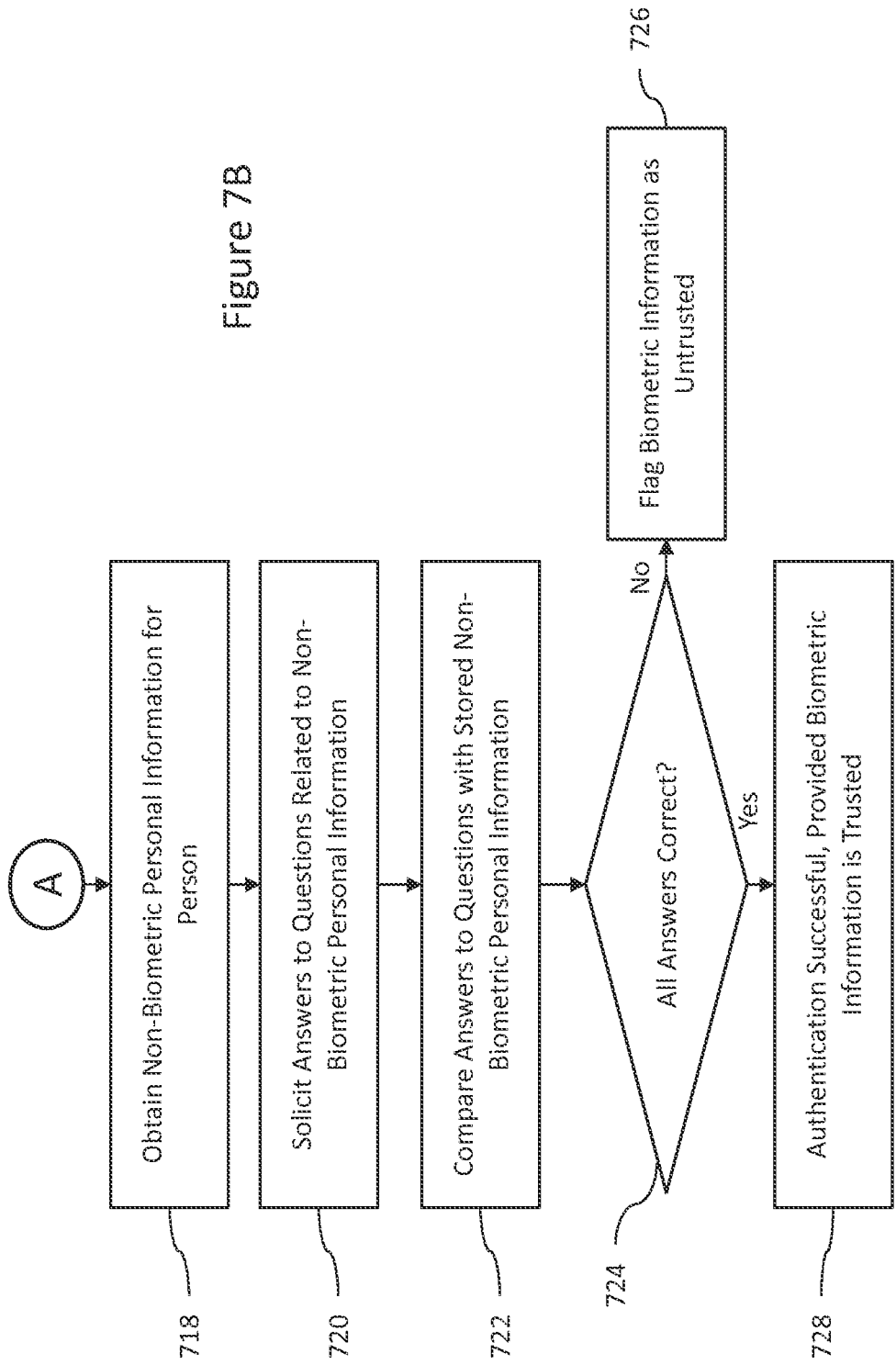

The authentication methods discussed above rely upon the existence of a trusted biometric as part of the authentication. However, exemplary embodiments of the present invention do not necessarily require the existence of a trusted biometric for authentication, which is illustrated in FIGS. 7A and 7B. This method can be used, for example, when a person decides to apply for an account, such as a bank, credit card, and/or investment account. When there is no available historical biometric information for a person (step 702), the person can provide personal information that includes a biometric and payment credentials (step 704). The payment credentials can be for one or more credit, debit, bank, and/or investment accounts. If a higher level of trust is desired then payment credentials for two or more credit, debit, bank, and/or investment accounts can be required. The centralized computer 120 uses the payment credentials to attempt to authorize a transaction for a nominal amount with a payment network, bank, and/or investment institution (step 706). If the payment authorization is not successful ("No" path out of decision step 708), then the biometric provided by the person is flagged as untrusted and can be added to a biometric blacklist (step 710).

If the payment authorization was successful ("Yes" path out of decision step 708), then the centralized computer 120 compares the biometric provided by the person to biometrics of known fraudsters (step 712). The biometrics of known fraudsters can be obtained, for example, from a biometric blacklist. If the centralized computer 120 determines that there is a match to one of the biometrics of known fraudsters ("Yes" path out of decision step 714), then the biometric is flagged as untrusted (step 716). If the centralized computer 120 determines there is not a match with one of the biometrics of known fraudsters ("No" path out of decision step 714), then, as illustrated in FIG. 7B, non-biometric personal information is obtained for the person (step 718). This non-biometric personal information can be obtained during a bulk upload from one or more of the information sources 100 independent of this process or can be requested by the centralized computer 120 from one or more information sources 100 specifically for this process.

The centralized computer 120 then solicits from the person to be authenticated answers to questions related to the obtained non-biometric personal information (step 720). If the contact with the person to be authenticated is maintained from when the person provided the personal information in step 704, then the solicitation of answers to questions is performed as part of the existing contact. The manner of contacting the person should involve the ability to obtain biometric information from the person. For example, the contact can be by telephone, voice or video chat, and voice biometric information can be collected. The solicitation and collection of answers to the questions can be performed via a person's mobile application or a browser-based application, or can be performed independently of an application. Further, the solicitation and collection can be fully automated.

The centralized computer 120 compares the answers provided by the person with the stored non-biometric personal information (step 722) to determine whether all answers are correct (step 724). When the centralized computer 120 determines that not all of the answers are correct ("No" path out of decision step 724), then the biometric information provided in step 704 cannot be trusted at this time (step 726). Various actions can be taken following this determination, such as adding the biometric to a blacklist, storing the biometric as a historical biometric for future processing (e.g., to identify trusted biometrics), and/or notifying the information source that provided the information for which the incorrect answer was provided. When the centralized computer 120 determines that all of the answers are correct ("Yes" path out of decision step 724), then the person is authenticated and the biometric information provided in step 704 can be identified as trusted (step 728).

It should be recognized that authentication can be performed without performing all of the steps described above in connection with FIGS. 7A and 7B. For example, the authorization can be performed based solely on the payment authorization of step 708 or based on the payment authorization of step 708 and the lack of a biometric match with known fraudsters of step 714.

It should be appreciated that the centralized computer 120 configured as a single, universal repository of trusted biometric and associated non-biometric information is particularly useful for information users that do not have a pre-existing relationship with the person to be authenticated. For example, when a person first opens a bank account the bank typically can request that the person provide personal information and compares it to credit bureau reports. However, the information available in credit bureau reports can easily be obtained by fraudsters and thus a bank may consider the person to be authentic because the personal information provided matches the credit bureau reports. However, by further verifying the person's identity using a trusted biometric the bank can have a high level of confidence that the person is actually authentic.

In any of the methods described above when a fraudster is identified and/or a biometric is added to a blacklist, this information can be forwarded to the information source that provided the biometric and/or other information sources and information users can be informed.

The use of the term bank in the description above should be interpreted broadly to cover any type of institution that holds funds for customers, including, but not limited to, credit unions, investment banks or institutions, savings and loan institutions, and/or any entity where a trust relationship is required.

For ease of understanding, some of the methods have been described above in isolation. However, it should be recognized that these methods can be combined. For example, the dynamic search groups described in connection with FIG. 2B can be employed when there is a failure in the authentication of the methods in FIGS. 7A and 7B that attempt to authenticate using a payment authorization.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising:
receiving, by a centralized computer, personal information for a first person from a plurality of independent sources, wherein the personal information for the first person includes first historical biometric information from a first one of the plurality of independent sources and second historical biometric information from a second one of the plurality of independent sources;
comparing, by the centralized computer, the first and second historical biometric information;
determining, by the centralized computer, a first similarity measure based on the comparison of the first and second historical biometric information;
identifying, by the centralized computer, the first and second historical biometric information as trusted first and second biometric information when the first similarity measure is greater than or equal to a first similarity measure threshold;
receiving, by the centralized computer, a request to authenticate a person, wherein the request to authenticate includes third biometric information;
comparing, by the centralized computer, the third biometric information with the first trusted biometric information, the trusted second biometric information, or a composite of at least the first and second trusted biometric information;
determining, by the centralized computer, a second similarity measure based on the comparison of the third biometric information with the first trusted biometric information, the second trusted biometric information, or the composite of at least the first and second trusted biometric information; and authenticating, by the centralized computer, the person as the first person when the second similarity measure is greater than or equal to a second similarity measure threshold.

2. The method of claim 1, wherein the first, second, and third biometric information is voice biometric information.

3. The method of claim 1, further comprising:
receiving, by the centralized computer, additional, non-biometric personal information for the first person from one of the plurality of independent sources; and
comparing, by the centralized computer, the additional, non-biometric personal information for the first person with other non-biometric personal information for the first person, wherein the other non-biometric personal information is obtained from a source other than the plurality of independent sources,
wherein the first person is identified as trusted when
the first similarity measure is greater than or equal to the first similarity measure threshold; and
the additional, non-biometric personal information matches the other non-biometric personal information.

4. The method of claim 3, wherein when the additional, non-biometric personal information does not match the other non-biometric personal information, the method further comprises:
informing an information source that provided the third biometric information or an information user that the third biometric information is not associated with the first person.

5. The method of claim 1, further comprising:
receiving, by the centralized computer, an indication whether the first person is in good standing with at least one of the plurality of independent sources for a predetermined period of time,
wherein the first and second biometric information is identified as trusted first and second biometric information when
the first similarity measure is greater than or equal to the first similarity measure threshold; and
the first person is in good standing with at least one of the first or second one of the plurality of independent sources for the predetermined period of time.

6. The method of claim 1, wherein the personal information for the first person is received from the first one and second one of the plurality of independent sources in bulk with personal information for a plurality of other persons.

7. The method of claim 6, wherein the personal information for the first person and the plurality of other persons includes historical voice biometric information obtained independent of a process of identifying the person and the plurality of other persons as trusted.

8. The method of claim 1, wherein the first and second similarity measure thresholds are the same.

9. The method of claim 1, wherein the third biometric information is near-real-time biometric information.

10. The method of claim 1, wherein the person is authenticated as the first person based exclusively on whether the second similarity measure is greater than or equal to the second similarity measure threshold.

11. The method of claim 1, wherein the authentication of the first person further comprises:
comparing, by the centralized computer, the third biometric information with biometric information in a blacklist of known fraudsters.

12. The method of claim 1, wherein when the second similarity measure is less than the second similarity measure threshold, the method further comprises:
selecting, by the centralized computer, a dynamic search group of individuals that may have unauthorized access to personal information of the first person;
comparing, by the centralized computer, available biometric information for each of the individuals in the dynamic search group with the third biometric information;
determining, by the centralized computer, a third similarity measure based on the comparison of the available biometric information for each of the individuals in the dynamic search group with the third biometric information; and
adding any of the individuals to a blacklist when the third similarity measure for a particular one of the individuals is greater than or equal to a predetermined third similarity measure.

13. The method of claim 1, wherein the first person has a device executing an application, and after authenticating the person as the first person the method further comprises:
receiving, by the application from the centralized computer, a single-use password; and
providing, by the application, the single-use password to the person,
providing, by the person to a third party, a user name and the single-use password;
transmitting, by the third party, the user name and a password to the centralized computer; and
receiving, by the third party, an authorization of the person when the password transmitted to the centralized computer matches the single-use password.

14. The method of claim 1, wherein when the second similarity measure is less than the second similarity measure threshold, the method comprises:
comparing, by the centralized computer, the second similarity measure to a third similarity measure threshold, wherein the third similarity measure threshold is lower than the second similarity measure threshold; and
adding the third biometric information to a blacklist when the second similarity measure is less than the third similarity measure threshold.

15. The method of claim 1, wherein when the second similarity measure is less than the second similarity measure threshold and the person to be authenticated as the first person provides an information user with the third biometric via an inbound call to the information user, the method comprises:
initiating, by the centralized computer, a contact using contact information associated with the first person;
capturing, by the centralized computer, a fourth biometric information from a person answering the contact;
comparing, by the centralized computer, the third biometric information with a fourth biometric information that is received during the solicitation of answers to questions;
determining, by the centralized computer, a third similarity measure based on the comparison of the third biometric information with the fourth biometric information;
authenticating, by the centralized computer, the person answering the contact as the first person when the third similarity measure is greater than or equal to a third similarity measure threshold;
querying, by the centralized computer, the person answering the contact as to whether they initiated the call to the information user; and allowing an interaction between the person authenticated as the first person and the information user when the person answering the contact indicates that they initiated the call to the information user.

16. The method of claim 15, wherein the querying further comprises soliciting answers to questions that are generated using the personal information and the interaction is allowed between the person authenticated as the first person and the information user when the person answering the contact indicates that they initiated a call to the information user and all of the questions are answered correctly.

17. The method of claim 16, wherein when the third biometric information is added to a blacklist when the person authenticated as the first person indicates that they did not initiate the call to the information user or the fourth biometric information is added to the blacklist when the person answering the contact does not answer all of the questions correctly.

18. The method of claim 15, wherein
the third biometric information is added to a blacklist when the person authenticated as the first person indicates that they did not initiate the call to the information user; or
the fourth biometric information is added to the blacklist when the third similarity measure is less than the third similarity measure threshold.

19. The method of claim 15, wherein when the person answering the contact indicates that they initiated the call to the information user the method further comprises:
comparing, by the centralized computer, the third biometric information and the fourth biometric information; and
adding the third biometric information to a blacklist when the third biometric information does not match the fourth biometric information.

20. The method of claim 1, wherein the first person has a device executing an application, the method further comprising:
transmitting, by the centralized computer to the application, a voting ballot;
receiving, by the centralized computer from the application, a completed voting ballot and fourth biometric information;
determining, by the centralized computer, a third similarity measure based on the comparison of the third biometric information with the fourth biometric information;
authenticating, by the centralized computer, the completed voting ballot as being received from the first person when the third similarity measure is greater than or equal to a third similarity measure threshold; and
submitting, by the centralized computer, the completed voting ballot as a final ballot for the first person when the completed ballot is authenticated.

21. The method of claim 1, wherein when the second similarity measure is less than the second similarity measure threshold, the method further comprises:
informing an information source that provided the third biometric information or an information user that the third biometric information is not associated with the first person.

22. A method, comprising:
receiving, by a centralized computer, personal information for a first person from a plurality of independent sources, wherein the personal information for the first person includes first historical biometric information from a first one of the plurality of independent sources;
receiving, by the centralized computer, a request to authenticate a person, wherein the request to authenticate includes second biometric information;
comparing, by the centralized computer, the second biometric information with the first historical biometric information;
determining, by the centralized computer, a similarity measure based on the comparison of the second biometric information with the first historical biometric information;
authenticating, by the centralized computer, the person as the first person when the similarity measure is greater than or equal to a similarity measure threshold; and
identifying, by the centralized computer, the first historical biometric information and the second biometric information as first and second trusted biometric information when the similarity measure is greater than or equal to the similarity measure threshold.

23. The method of claim 22, further comprising:
receiving, by the centralized computer, additional, non-biometric personal information for the first person from one of the plurality of independent sources; and
comparing, by the centralized computer, the additional, non-biometric personal information for the first person with other non-biometric personal information for the first person,
wherein the first person is authenticated when
the similarity measure is greater than or equal to a similarity measure threshold; and
the additional, non-biometric personal information matches the other non-biometric personal information.

24. The method of claim 22, further comprising:
receiving, by the centralized computer, an indication whether the first person is in good standing with at least one of the plurality of independent sources for a predetermined period of time,
wherein the first person is authenticated when
the similarity measure is greater than or equal to the similarity measure threshold; and
the first person is in good standing with at least one of the plurality of independent sources for the predetermined period of time.

25. A method, comprising:
receiving, by a centralized computer, personal information for a first person from a plurality of independent sources, wherein the personal information for the first person includes first historical biometric information from a first one of the plurality of independent sources and second historical biometric information from a second one of the plurality of independent sources;
comparing, by the centralized computer, the first and second historical biometric information;
determining, by the centralized computer, a first similarity measure based on the comparison of the first and second historical biometric information;
identifying, by the centralized computer, the first and second historical biometric information as first and second trusted biometric information when the first similarity measure is greater than or equal to a first similarity measure threshold;
identifying, by the centralized computer, a high-risk transaction;
initiating, by the centralized computer, a contact using contact information associated with the first person;
capturing, by the centralized computer, a third biometric information from a person answering the contact;
comparing, by the centralized computer, the third biometric information with the first trusted biometric information, the second trusted biometric information, or a composite of at least the first and second trusted biometric information;

determining, by the centralized computer, a third similarity measure based on the comparison of the third biometric information with the first trusted biometric information, the second trusted biometric information, or the composite of at least the first and second trusted biometric information;

allowing the high-risk transaction to proceed between the person answer the contact and an information user and authenticating the person answering the contact as the first person when the third similarity measure is greater than or equal to a third similarity measure threshold.

26. The method of claim 25, further comprising:

querying, by the centralized computer of the person answering the contact, whether they initiated the high-risk transaction, wherein the high-risk transaction is allowed between the person authenticated as the first person and the information user when the person answering the contact indicates that they initiated the high-risk transaction.

27. The method of claim 25, further comprising:

querying, by the centralized computer of the person answering the contact, whether they initiated the high-risk transaction;

querying, by the centralized computer of the person answering the contact, answers to questions that are generated using the personal information, wherein the high-risk transaction is allowed between the person authenticated as the first person and the information user when the person authenticated as the first person indicates that they initiated the high-risk transaction and all of the questions are answered correctly.

28. The method of claim 27, wherein the third biometric information is added to a blacklist when the first or second biometric information is not available and not all of the questions are answered correctly.

29. The method of claim 25, wherein the third biometric information is added to a blacklist when the person is not authenticated as the first person.

30. The method of claim 25, wherein the centralized computer identifies the high-risk transaction by being informed of the high-risk transaction by a request from the information user that received the high-risk transaction from the first person.

* * * * *